US009162636B2

(12) United States Patent
Nakayama et al.

(10) Patent No.: US 9,162,636 B2
(45) Date of Patent: Oct. 20, 2015

(54) ELECTRIC CONNECTION BOX

(75) Inventors: Makoto Nakayama, Makinohara (JP);
Norio Ito, Makinohara (JP); Ryo Nakano, Makinohara (JP); Tatsuya Tsubouchi, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 237 days.

(21) Appl. No.: 13/697,596

(22) PCT Filed: May 11, 2011

(86) PCT No.: PCT/JP2011/060828
§ 371 (c)(1),
(2), (4) Date: Nov. 13, 2012

(87) PCT Pub. No.: WO2011/142378
PCT Pub. Date: Nov. 17, 2011

(65) Prior Publication Data
US 2013/0056238 A1    Mar. 7, 2013

(30) Foreign Application Priority Data

May 14, 2010   (JP) .................................. 2010-111956
Apr. 13, 2011  (JP) .................................. 2011-088899

(51) Int. Cl.
*H01R 13/46*    (2006.01)
*H01R 13/502*   (2006.01)
*B60R 16/023*   (2006.01)

(52) U.S. Cl.
CPC .................................. *B60R 16/0238* (2013.01)

(58) Field of Classification Search
CPC ........ H02G 3/08; H02G 3/16; B60R 16/0238; B60R 16/0239
USPC .............. 174/50, 59, 520, 559; 361/600, 601, 361/679.01, 724, 730, 796; 220/3.2, 3.7, 220/3.8, 3.9, 4.02; 439/76.1, 76.2, 535, 439/536, 949
See application file for complete search history.

(56) References Cited

U.S. PATENT DOCUMENTS 2,968,689 A * 1/1961 Johnson ......................... 174/542
5,709,156 A * 1/1998 Gevaert et al. .............. 108/50.02
5,777,843 A * 7/1998 Younce .......................... 361/641

(Continued)

FOREIGN PATENT DOCUMENTS

CN    1467893 A    1/2004
JP    54-11470 U   1/1979

(Continued)

OTHER PUBLICATIONS

International Search Report dated Jul. 26, 2011, issued for PCT/JP2011/060828.

(Continued)

*Primary Examiner* — Angel R Estrada
*Assistant Examiner* — Dimary Lopez Cruz
(74) *Attorney, Agent, or Firm* — Locke Lord LLP

(57) ABSTRACT

An electric connection box 1 includes a bracket 2 in which a plurality of connectors 7a, 7b, 8a, 8b, 9a, 9b, 10a, 10b, 10b' joined with each end of electric wires 11, and a case main body 3 receiving the bracket 2. The electric connection box is provided with a mount device 81 mounting the bracket 2 in the case main body 3 movably between a near position near an opening 3a of a case main body 3 and a fix position 3c deeper than the near position near the opening 3c in the case main body 3, and a maintain device 82 maintaining a state that the bracket 2 is positioned at the near position near the opening 3a, and a fix device 83 fixing the bracket 2 positioned at the fix position 3c at the case main body 3.

13 Claims, 19 Drawing Sheets

(56) References Cited

U.S. PATENT DOCUMENTS

| | | | |
|---|---|---|---|
| 6,290,518 B1* | 9/2001 | Byrne | 439/131 |
| 6,361,336 B1* | 3/2002 | Zhao et al. | 439/157 |
| 6,641,423 B1* | 11/2003 | Giro | 439/347 |
| 7,037,124 B2* | 5/2006 | Lee et al. | 439/157 |
| 7,074,063 B1* | 7/2006 | Bailey et al. | 439/157 |
| 8,690,590 B2* | 4/2014 | Byrne | 439/131 |

FOREIGN PATENT DOCUMENTS

| | | |
|---|---|---|
| JP | 3-93415 A | 4/1991 |
| JP | 08-047144 A | 2/1996 |
| JP | 11-120893 A | 4/1999 |
| JP | 2004-023813 A | 1/2004 |
| JP | 2005-304134 A | 10/2005 |
| JP | 2010-051094 A | 3/2010 |

OTHER PUBLICATIONS

Office Action dated Dec. 29, 2014 issued for corresponding Chinese Patent Application No. 201180030625.7.

* cited by examiner

ELECTRIC CONNECTION BOX

TECHNICAL FIELD

This invention relates to an electric connection box arranged at an engine room of a car.

BACKGROUND ART

Various electronic devices are mounted at the car. For supplying electric power and transmitting signals to the various electronic devices, an electric connection box is arranged at the car (see patent documents 1-3).

The electric connection box having various structure is used. For example, the electric connection box 201 shown in FIG. 22 or the electric connection box 301 shown in FIG. 23 is for connecting a plurality of wiring harnesses 206, 207, 208 to each other according to a predetermined combination. Each of the electric connection boxes 201, 301 includes a case main body 203 receiving connectors 209a, 209b joined with an end of an electric wire 211 of the wiring harness 206, 207 or 208, an upper cover 204 covering an opening 203a at a top of the case main body 203 and a lower cover 205 covering an opening 203b at a bottom of the case main body 203.

The above electric connection box 201, 301 is assembled in following steps. First, the upper cover 204 and the lower cover 205 are removed from the case main body 203. Second, the connector 209a of the one wiring harness 206 is mounted into the case main body 203, and an electric wire 211 of the wiring harness 206 is led from a wire lead outlet 214 to an outside of the case main body 203. Next, the connector 209b of the other wiring harness 207 or 208 is fitted with the connector 209a of the one wiring harness 206, which connector 209a is mounted at the case main body 203, and the electric wires 211 of the other wiring harnesses 207, 208 are led out through wire lead outlets 215 to the outside of the case main body 203. Finally, the upper cover 204 and lower cover 205 are attached to the case main body. Thus, an operation of assembling the electric connection box 201 or 301 is completed.

As mentioned above, the connectors 209b of the other wiring harnesses 207, 208 are fitted to the connector 209a of the one wiring harness 206 and are fixed at the case main body 203. By inserting a hand from the opening 203a at the top of the case main body 203, operations of fitting the connector 209b with the connector 209a are acted.

CITATION LIST

Patent Document

Patent Document 1: Japan Patent Application Published No. 2010-051094
Patent Document 2: Japan Patent Application Published No. 2004-23813
Patent Document 3: Japan Patent Application Published No. 2005-304134

SUMMARY OF INVENTION

Objects to be Solved

The above usual electric connection box by prior art has following problems.

According to the electric connection box 201 shown in FIG. 22, for workability of fitting the connector 209b to the connector 209a, all connectors 209a, 209b is fixed in the vicinity of the opening 203a of the case main body 203. The electric wire 211 joined with the connector 209b may be pushed out of the case main body 203. Thereby, operation of assembling the upper cover 204 with the case main body 203 is troublesome. According to the above-mentioned structure, it is also troublesome that the electric wires 211 joined with the connector 209b are gathered close to the opening 203a. When the electric wires 211 is gathered close, the electric wires 211 interfere with each other, and heat releasing of the electric wires 211 becomes worse unpreferably.

According to the electric connection box 301 shown in FIG. 23, some of the connectors 209a, 209b provided at one side 203c of the case main body 203 are fixed in the vicinity of the opening 203a of the case main box 203; and other connectors 209a, 209b provided at the other side 203d of the case main body 203 are fixed at a deep area of the case main body 203. Thereby, problems of operation of assembling the upper cover 204 and gathering close the electric wires 211 are partly improved. It is troublesome that workability of fitting the connectors 209b to the connectors 209a provided at the deep area of the case main body 203 becomes worse. When the opening 203s of the electric connection box 301 has narrow dimension which is difficult to insert a hand into the electric connection box 301, and the other connectors 209a, 209b are fixed at the deep area of the case main body 203, it is troublesome that workability of fitting the connectors 209b to the connectors 209a provided at the deep side of the case main body 203 becomes much worse.

According to the above problems, an object of the present invention is to provide an electric connection box which can provide easy operation of fitting connectors even if an opening of a case main body has narrow dimension, and can prevent from gathering electric wires too close in the case main body, and can be assembled easily.

How to Attain the Object of the Present Invention

In order to overcome the above problems and attain the object, the present invention is to provide an electric connection box, which includes a bracket in which a plurality of connectors joined with each end of electric wires is mounted, and a case main body receiving the bracket, and further includes amount device mounting the bracket in the case main body movably between a near position near an opening of the case main body and a fix position deeper than the near position near the opening; and a maintain device maintaining a state that the bracket is positioned at the near position near the opening; and a fix device fixing the bracket, which is positioned at the fix position, at the case main body.

The electric connection box according to the above-mentioned invention is characterized in that the mount device is formed by a rotation shaft arranged at one end of the bracket and a rotation-shaft mount member arranged at the case main body and mounting the rotation shaft rotatably, and when the bracket is positioned at the fix position, the other end of the bracket is positioned at a far position further than the one end from the opening so as to incline the bracket.

The electric connection box according to the above-mentioned invention is characterized in that one side wall near the one end of the bracket of a plurality of side walls surrounding the opening of the case main body and the other side wall opposed to the one side wall are provided respectively with a wire lead outlet which the electric wire is led out of the case main body, and the electric wire, which is located deeper than the bracket in the case main body when the bracket is positioned at the fix position, is led out of the case main body through the wire lead outlet provided at the one side wall, and the electric wire, which is located nearer to the opening than the bracket when the bracket is positioned at the fix position, is led out of the case main body through the wire lead outlet provided at the other side wall.

The electric connection box according to the above-mentioned invention is characterized in that the maintain device includes a projection projecting from one of an inner surface of the side walls surrounding the opening of the case main body and an outer surface of the bracket opposed to the inner surface, and an arm continuous to the other one of the inner surface and the outer surface, and extending from the fix position toward the opening at an interval against the other one so as to be bendable as parting from the projection, and an overlap member projecting from a surface of the arm opposed to the projection so as to be enable to overlap the projection along a lengthwise direction of the arm, and when the projection and the overlap member are overlapped so as to locate one of the projection and the overlap member, which is provided at the side wall, nearer to the fix position than the other one of the projection and the overlap member, a state that the bracket is positioned at the near position near the opening is maintained, and when the bracket is positioned at the near position near the opening, and the arm is bent so as to part from the projection, the overlap member parts from the projection, sand the bracket becomes movable toward the fix position.

The electric connection box according to the above-mentioned invention is characterized in that the maintain device includes a projection projecting from one of an inner surface of the side walls surrounding the opening of the case main body and an inner surface of an outer wall of the bracket overlapped to the inner surface, and an arm continuous to the other one of the inner surface of the side walls and the inner surface of the outer wall, and extending from the opening toward the fix position so as to be bendable as parting from the projection, and an overlap member arranged at an end of the arm apart from the other one so as to be enable to overlap the projection along a lengthwise direction of the arm, and when the projection and the overlap member are overlapped so as to locate one of the projection and the overlap member, which is provided at the side wall, nearer to the fix position than the other one of the projection and the overlap member, a state that the bracket is positioned at the near position near the opening is maintained, and when the bracket is positioned at the near position near the opening, and the arm is bent so as to part from the projection, the overlap member parts from the projection, and the bracket becomes movable toward the fix position.

The electric connection box according to the above-mentioned invention is characterized in that the wire lead outlet, which is formed to be recessed from an end at the opening side of the side wall surrounding the opening of the case main body toward the fix position and leads the electric wire out of the case main body, is provided with a holder holding the electric wire, and the holder includes a wire mount portion mounting the electric wire and a main body inserted from the opening side of the wire lead outlet toward the fix position into the wire lead outlet so as to abut on the arm and bend the arm to part from the projection and fixed at an edge of the wire lead outlet.

The electric connection box according to the above-mentioned invention is characterized in that a second holder holding the electric wire is provided nearer to the opening than the holder at the wire lead outlet, and the connector joined with the electric wire held by the second holder is mounted at one end of the bracket far from the wire lead outlet, and the connector joined with the electric wire held by the holder is mounted at the other end of the bracket near the wire lead outlet.

Effects of the Invention

According to the above-mentioned present invention, the mount device mounting the bracket in the case main body movably between the near position near the opening of the case main body and the fix position deeper than the near position near the opening; and the maintain device maintaining the state that the bracket is positioned at the near position near the opening; and the fix device fixing the bracket, which is positioned at the fix position, at the case main body, are provided. Thereby, in the condition that the bracket is positioned near the opening, the connector can be mounted at the bracket, and the bracket in which the connector is mounted can be moved to the fix position and fixed at the case main body. Therefore, the electric connection box, which can provide easy operation of fitting connectors even if the opening of the case main body has narrow dimension, and can prevent from gathering electric wires too close in the case main body, and can be assembled easily, can be provided.

According to the above-mentioned present invention, the mount device is formed by the rotation shaft arranged at one end of the bracket and the rotation-shaft mount member arranged at the case main body and mounting the rotation shaft rotatably, and when the bracket is positioned at the fix position, the other end of the bracket is positioned at the far position further than the one end from the opening so as to incline the bracket. Thereby, the electric connection box which can prevent from gathering electric wires too close in the case main body, and be assembled easily, can be provided.

According to the above-mentioned present invention, one side wall near the one end of the bracket of the plurality of side walls surrounding the opening of the case main body and the other side wall opposed to the one side wall are provided respectively with the wire lead outlet which the electric wire is led out of the case main body, and the electric wire, which is located deeper than the bracket in the case main body when the bracket is positioned at the fix position, is led out of the case main body through the wire lead outlet provided at the one side wall, and the electric wire, which is located nearer to the opening than the bracket when the bracket is positioned at the fix position, is led out of the case main body through the wire lead outlet provided at the other side wall. Thereby, the electric connection box can prevent from gathering electric wires too close in the case main body, and without overbending the electric wire, the electric wire can be led from the wire lead outlet to the outside of the case main box. Thus, the electric connection box, which can route the electric wire in the best wiring pass, can be provided.

According to the above-mentioned present invention, the maintain device includes the projection projecting from one of the inner surface of the side walls surrounding the opening of the case main body and the outer surface of the bracket opposed to the inner surface, and the arm continuous to the other one of the inner surface and the outer surface, and extending from the fix position toward the opening at an interval against the other one so as to be bendable as parting from the projection, and the overlap member projecting from the surface of the arm opposed to the projection so as to be enable to overlap the projection along the lengthwise direction of the arm, and when the projection and the overlap member are overlapped so as to locate one of the projection and the overlap member, which is provided at the side wall, nearer to the fix position than the other one of the projection and the overlap member, a state that the bracket is positioned at the near position near the opening is maintained, and when the bracket is positioned at the near position near the opening, the arm is bent so as to part from the projection, the overlap member parts from the projection, and the bracket can move toward the fix position. Thereby, the electric connection box which can be assembled easily by simple structure, can be provided.

According to the above-mentioned present invention, the maintain device includes a projection projecting from one of the inner surface of the side walls surrounding the opening of the case main body and the inner surface of the outer wall of the bracket overlapped to the inner surface, and the arm continuous to the other one of the inner surface of the side walls and the inner surface of the outer wall, and extending from the opening toward the fix position so as to be bendable as parting from the projection, and the overlap member arranged at an end of the arm apart from the other one so as to be enable to overlap the projection along a lengthwise direction of the arm, and when the projection and the overlap member are overlapped so as to locate one of the projection and the overlap member, which is provided at the side wall, nearer to the fix position than the other one of the projection and the overlap member to the fix position, a state that the bracket is positioned at the near position near the opening is maintained, and when the bracket is positioned at the near position near the opening, and the arm is bent so as to part from the projection, the overlap member parts from the projection and the bracket becomes movable toward the fix position. Thereby, the electric connection box which can be assembled easily by simple structure, can be provided.

The overlap member is arranged at the end of the arm apart from the other one, so that when the holder releases overlapping of the overlap member and the projection, the holder is separated from the bracket 2. Therefore, electric components such a relay can be mounted at an area near a limit member of the bracket, so that the bracket, that is the electric connection box, can be miniaturized.

According to the above-mentioned present invention, the wire lead outlet, which is formed to be recessed from an end at the opening side of the side wall surrounding the opening of the case main body toward the fix position and leads the electric wire out of the case main body, is provided with a holder holding the electric wire, and the holder includes a wire mount portion mounting the electric wire and a main body inserted from the opening side of the wire lead outlet toward the fix position into the wire lead outlet so as to abut on the arm and bend the arm to part from the projection and fixed at an edge of the wire lead outlet. Thereby, by operation of mounting the holder at the wire lead outlet, the bracket is moved from the near position near the opening toward the fix position. Thus, the electric connection box, which can be assembled easily by simple structure, can be provided.

According to the above-mentioned present invention, the second holder holding the electric wire is provided nearer to the opening than the holder at the wire lead outlet, and the connector joined with the electric wire held by the second holder is mounted at one end of the bracket far from the wire lead outlet, and the connector joined with the electric wire held by the holder is mounted at the other end of the bracket near the wire lead outlet. Thereby, the electric connection box which can prevent from gathering electric wires too close in the case main body, and be assembled easily, can be provided.

DESCRIPTION OF EMBODIMENTS

A first embodiment of an electric connection box according to the present invention will be described with reference to FIGS. 1-17. The electric connection box 1 according to the present invention is installed in an engine room of a car for supplying electric power and transmitting signal to various electronic devices mounted at the car.

Figure 1:
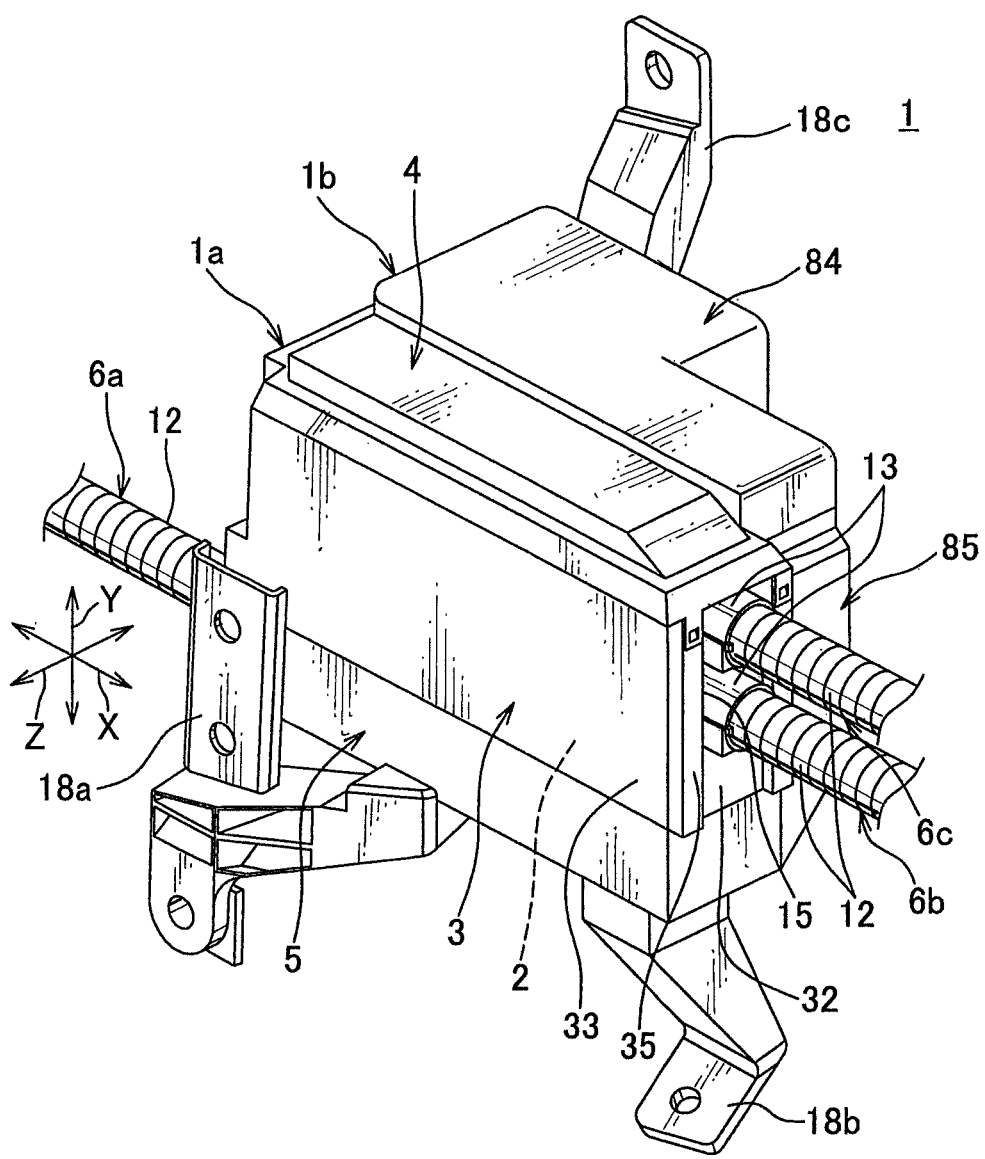
FIG. 1 is a perspective view of a first embodiment of an electric connection box according to the present invention.

The electric connection box 1 includes, as shown in FIG. 1, a first case 1a, a second case 1b, and fixing members 18a, 18b, 18c. The first case 1a and the second case 1b are formed respectively as separated components and fixed to each other after they are formed. The first case 1a is to connect a plurality of wiring harnesses 6a, 6b, 6c to each other according to a predetermined pattern. The second case 1b is to receive a fuse, fusible link and the like, and includes a case main body 85 and an upper cover 84. Structure of the first case 1a will be explained in detail as following.

Figure 2:
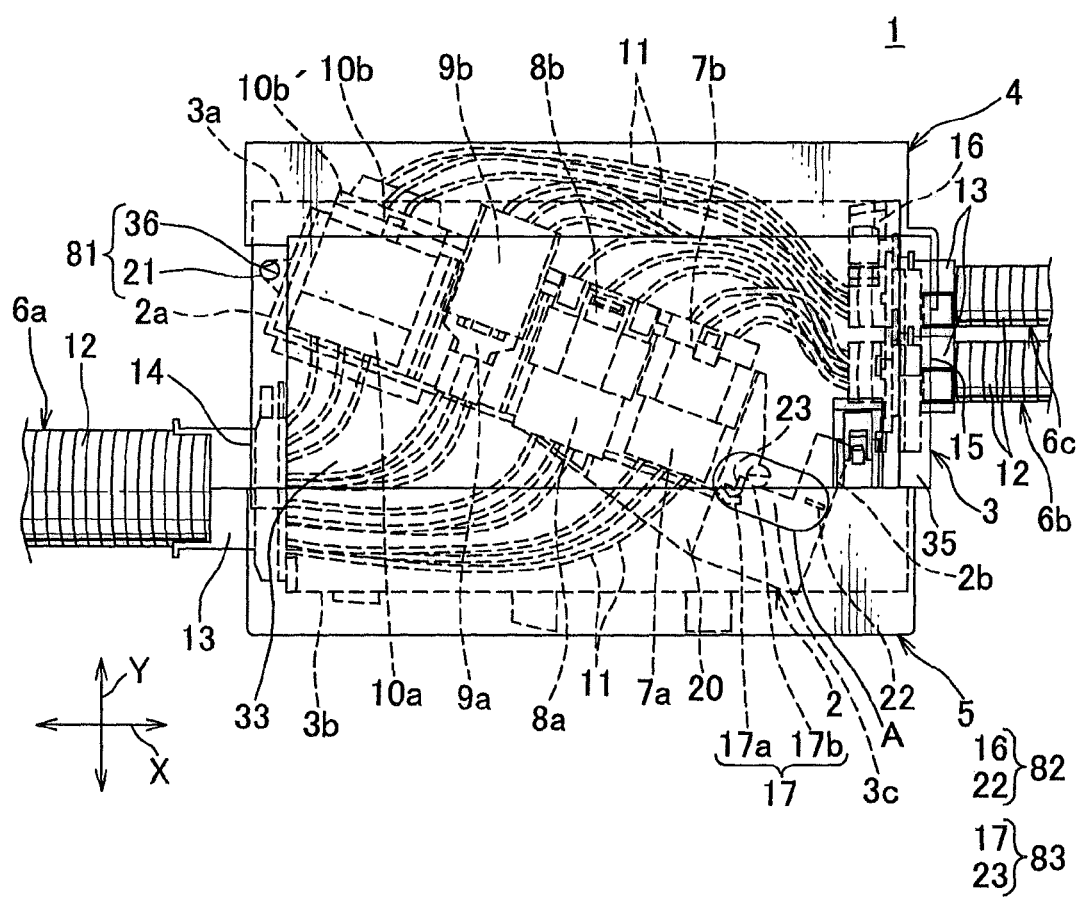
FIG. 2 is a transparent view of the electric connection box shown in FIG. 1.

The first case 1a forming the electric connection box 1 of the present invention, as shown in FIG. 2, includes a bracket 2 in which connectors 7a, 7b, 7b', 8a, 8b, 9a, 9b, 10a, 10b, 10b' of the plurality of wiring harnesses 6a, 6b, 6c are mounted, a case main body 3 receiving the bracket 2, an upper cover 4 covering an opening 3a at a top of the case main body 3, a lower cover 5 covering an opening 3b at a bottom of the case main body 3, and three holders 13 fixing each wiring harness 6a, 6b, 6c at wire lead outlets 14, 15 provided at the case main body 3.

The first case 1a of the electric connection box 1 further includes a mount device 81 mounting the bracket 2 movably at the case main body 3 between a near position near the opening 3a of the case main body 3 and a fix position deeper than the near position, a maintain device 82 maintaining a condition that the bracket 2 is positioned at the near position near the opening 3a; and a fix device 83 fixing the bracket 3, which is positioned at the fix position 3c, at the case main body 3.

An arrow Y in FIGS. 1-17 shows a direction parallel to a vertical direction and a depth direction of the first case 1a. An arrow X shows a direction parallel to a horizontal direction and a lengthwise direction of the first case 1a. An arrow Z shows a direction parallel to the horizontal direction and a widthwise direction of the first case 1a. In the present invention, an up-down direction means the direction Y, that is the depth direction of the first case 1a. A top of a sheet along the direction Y in FIGS. 1-17 is called as a top, and a bottom of the sheet against the top along the direction Y is called as a bottom.

In the description, the wiring harness 6a is called as a first wiring harness 6a, the wiring harness 6b is called as a second wiring harness 6b, the wiring harness 6c is called as a third wiring harness 6c. Each of the wiring harnesses 6a, 6b, 6c includes a plurality of electric wires 11, connectors 7a, 7b, 7b', 8a, 8b, 9a, 9b, 10a, 10b, 10b' joined with each end of the electric wires 11, and a corrugate tube 12 receiving the bound electric wires 11 therein as shown in FIGS. 1, 2. Each of the connectors 7a, 7b, 7b', 8a, 8b, 9a, 9b, 10a, 10b, 10b' includes terminals joined with the electric wires 11 and a housing receiving the terminals.

The case main body 3 is formed into a rectangular cylindrical tube with a plurality of side walls 31, 32, 33, 34 by synthetic resin.

The opening 3a means a space surrounded by top edges in the direction Y of the plurality of side walls 31, 32, 33, 34. The opening 3b means a space surrounded by bottom edges in the direction Y of the plurality of side walls 31, 32, 33, 34. Each opening 3a, 3b has a narrow dimension difficult to insert a hand into the case main body 3.

The wire lead outlet 14 is provided at the side wall 31. The wire lead outlet 14 is formed by recessing from an edge at a side of the opening 3b of the side wall 31 toward the opening 3a. Thus, the wire lead outlet 14 is formed by cutting out the side wall 31 rectangularly. The electric wires 11 and corrugate tube 12 of the first wiring harness 6a are passed through the wire lead outlet 14.

The wire lead outlet 15 is provided at the side wall 32 opposed to the side wall 31. The wire lead outlet 15 is formed by recessing from an edge at a side of the opening 3a of the side wall 32 toward the fix position 3c, that is the opening 3b. Thus, the wire lead outlet 15 is formed by cutting out the side wall 32 rectangularly. The electric wires 11 and corrugate tube 12 of the second wiring harness 6b and the electric wires 11 and corrugate tube 12 of the third wiring harness 6c are passed through the wire lead outlet 15. The electric wires 11 and corrugate tube 12 of the third wiring harness 6c are positioned nearer to the opening 3a of the wire lead outlet 15 than the electric wires 11 and corrugate tube 12 of the second wiring harness 6b.

Figure 3:
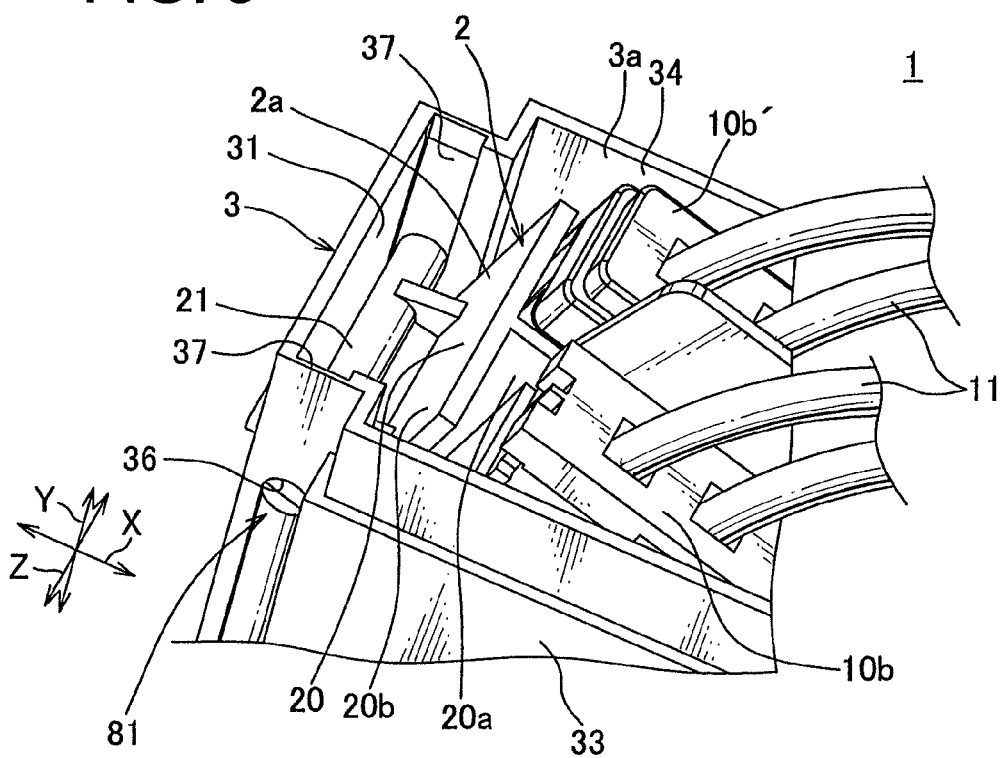
FIG. 3 is a perspective view of the electric connection box shown in FIG. 2 in which an upper cover is removed.
Figure 7:
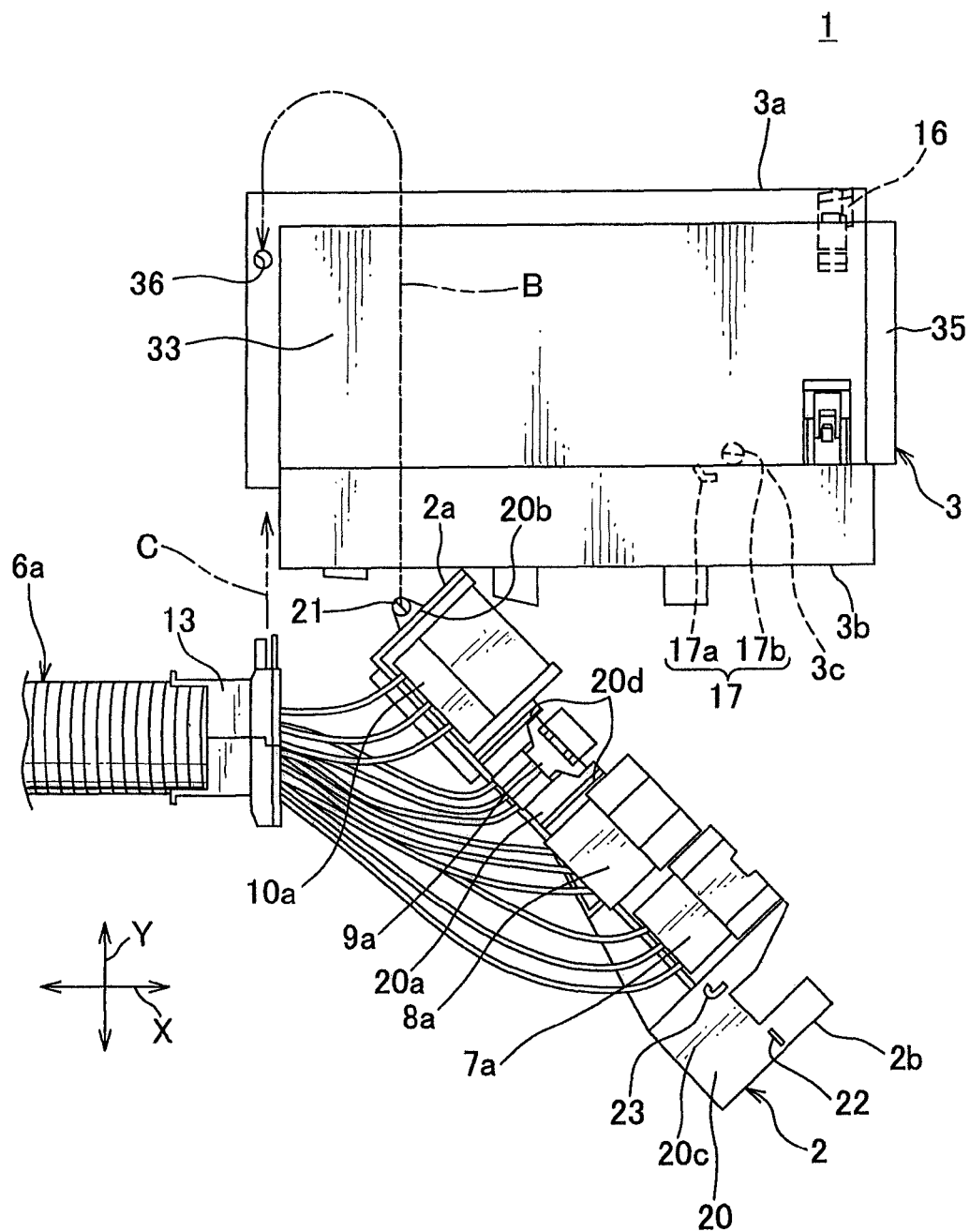
FIG. 7 is an illustration of explaining a method for assembling the electric connection box shown in FIG. 2, and showing connectors of a first wiring harness mounted at a bracket before mounted at a case main body.
Figure 10:
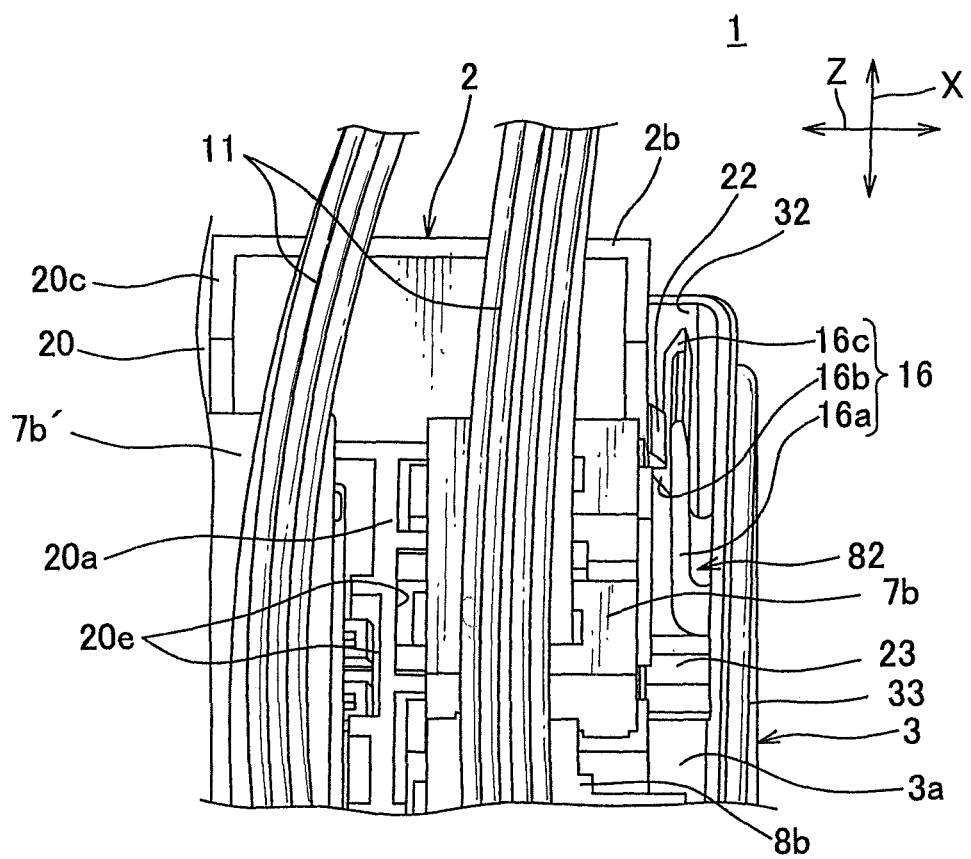
FIG. 10 is an illustration explaining a method for assembling the electric connection box shown in FIG. 2, and showing the connectors of the first wiring harness mounted at the bracket shown in FIG. 8 fitted with connectors of a second wiring harness.
Figure 11:
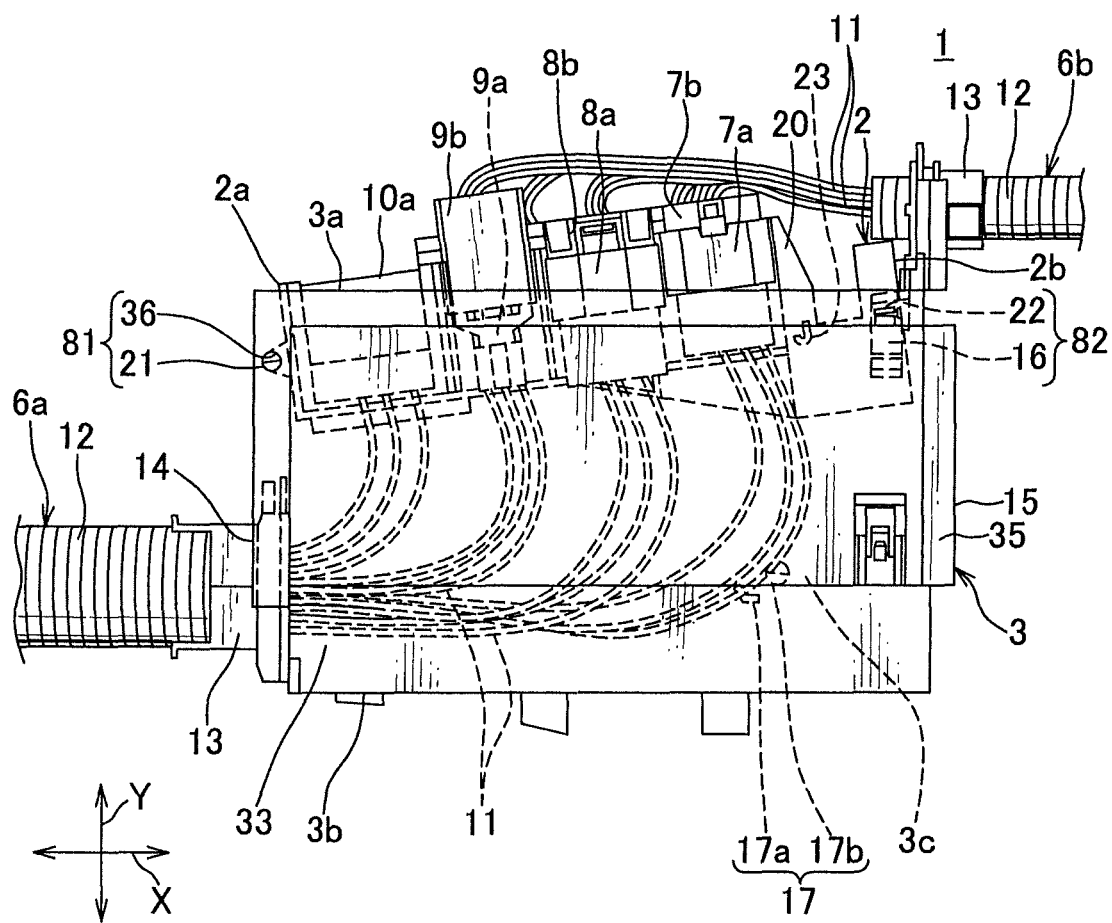
FIG. 11 is an illustration explaining a method for assembling the electric connection box shown in FIG. 2, and showing the holder mounted at the second wire harness shown in FIG. 10 positioned near a wire lead outlet.
Figure 12:
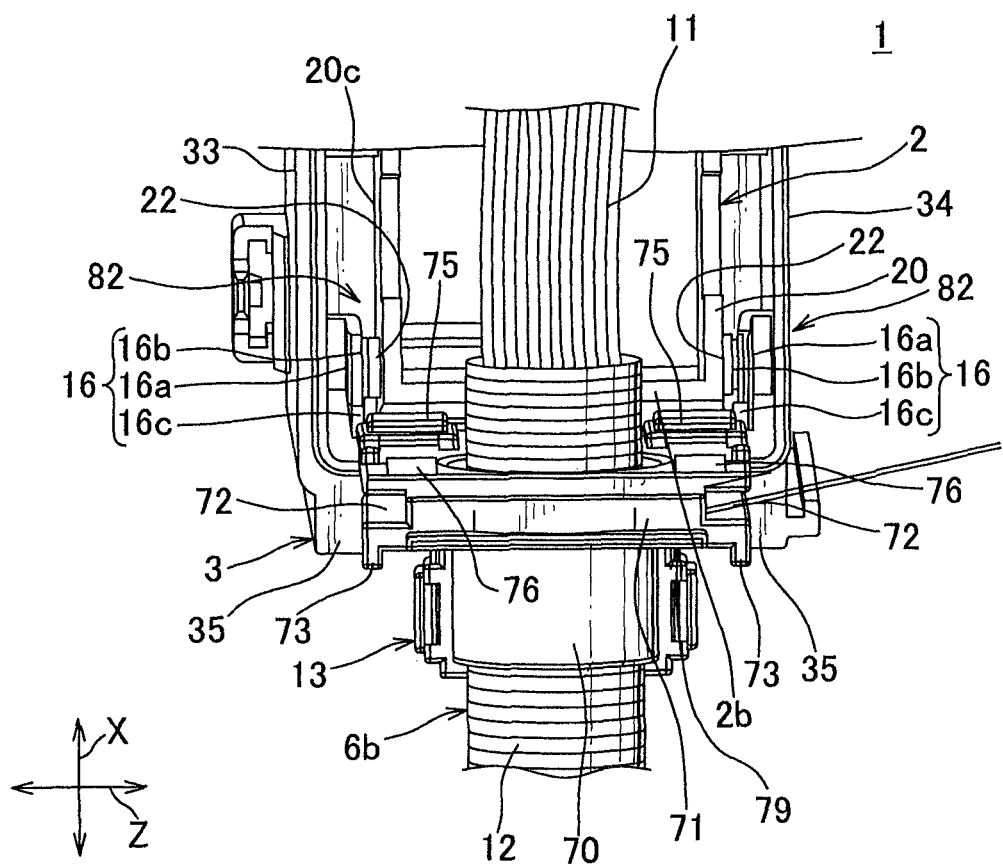
FIG. 12 is a perspective view of the case main body shown in FIG. 11 and the holder mounted at the second wiring harness when viewed from top.

The bracket 2 is made of synthetic resin. The bracket, as shown in FIGS. 3, 7, 10, includes a bracket main body 20, a rotation shaft 21 forming the mount device 81, a pair of projections 22 forming the maintain device 82, and a protrusion 23 forming the fix device 83.

The bracket main body 20 includes a plate portion 20a in which each connector 7a, 8a, 9a, 10a of the first wiring harness 6a is mounted on a front surface and a rear surface thereof; a second plate portion 20b continuous to one end along a lengthwise direction of the plate portion 20a; a rectangular tube portion 20c continuous to the other end along the lengthwise direction of the plate portion 20a, in which an antitheft relay (not shown) is mounted therein; a plurality of partition walls 20d extending with a plate-shape vertically from the front surface and the rear surface of the plate portion 20a so as to be positioned between connectors 7a, 8a, 9a, 10a; a lock portion 20e provided on the front surface and the rear surface of the plate portion 20a so as to lock with and mount the connector 7a, 8a, 9a, 10a.

Each connector 7a, 8a, 9a, 10a of the first wiring harness 6a is mounted directly at the bracket main body 20. The connectors 7a, 8a, 9a, 10a are mounted on the front surface and the rear surface of the plate portion 20a so as to make row along the lengthwise direction of the plate portion 20a. Each connector 7b, 7b', 8b, 9b of the second wiring harness 6b and each connector 10b, 10b' of the third wiring harness 6c are fitted with each connector 7a, 8a, 9a, 10a of the first wiring harness 6a mounted at the bracket main body 20 so as to be mounted indirectly at the bracket main body 20 (the connectors 7b', 10b' of the connectors of the first wiring harness 6a are not shown).

Each connector 7b, 7b', 8b, 9b of the second wiring harness 6b and each connector 10b, 10b' of the third wiring harness 6c are fitted with each connector 7a, 8a, 9a, 10a of the first wiring harness 6a along a direction parallel to the widthwise direction of the plate portion 20a. When the connectors 7a, 7b, 7b', 8a, 8b, 9a, 9b, 10a, 10b, 10b' are fitted to each other, plural wiring harnesses 6a, 6b, 6c are connected with each other according to a predetermined pattern.

The rotation shaft 21 is formed into a cylindrical shape to be continuous to the second plate portion 20b. In other words, the rotation shaft 21 is provided at one end 2a of the bracket 2. An axial direction of the rotation shaft 21 is parallel to a thickness direction of the plate portion 20a.

The pair of projections 22 projects from each outer surface of walls, which are opposed to each other along the axial direction of the rotation shaft 21, of the rectangular tube portion 20c so as to separate to each other. In other words, the pair of projections 22 is provided at the other end 2b of the bracket 2.

The protrusion 23 projects from an outer surface, on which the projection 22 is provided, of the tube portion 20c. In other words, the protrusion 23 is provided at the other end 2b of the bracket 2. The protrusion 23 is formed into a J-shape in plan view.

Figure 5:
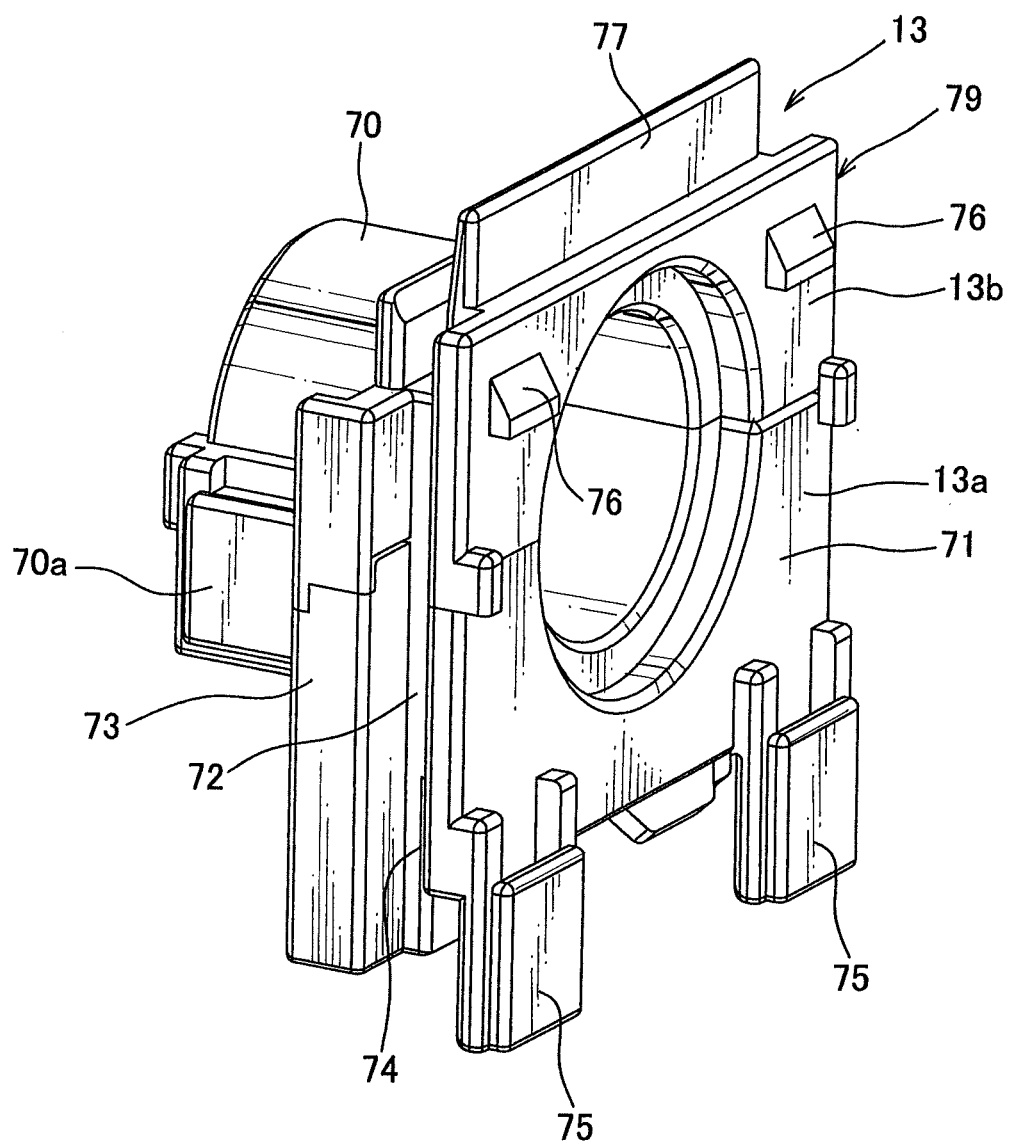
FIG. 5 is a perspective view of a holder forming the electric connection box shown in FIG. 2.
Figure 6:
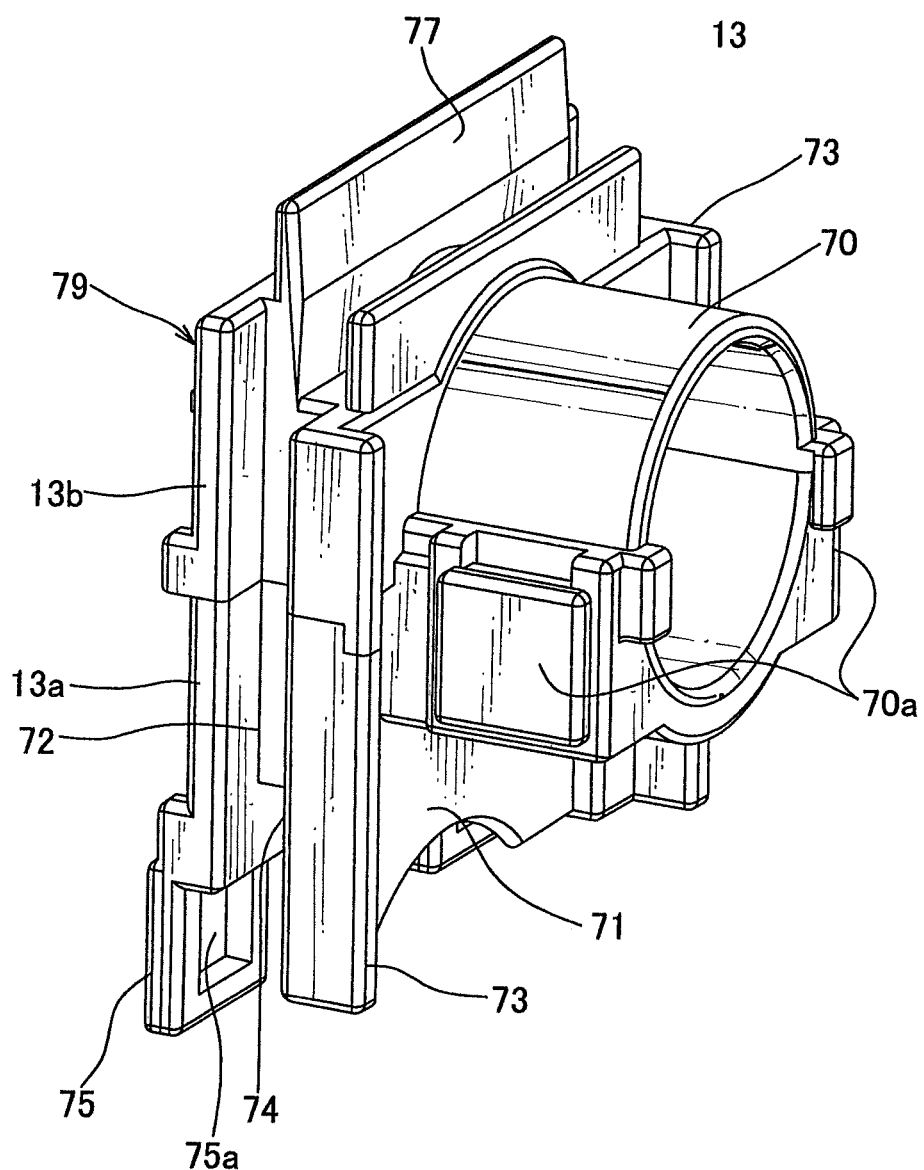
FIG. 6 is a perspective view of the holder shown in FIG. 5 when viewed from an opposite side.
Figure 16:
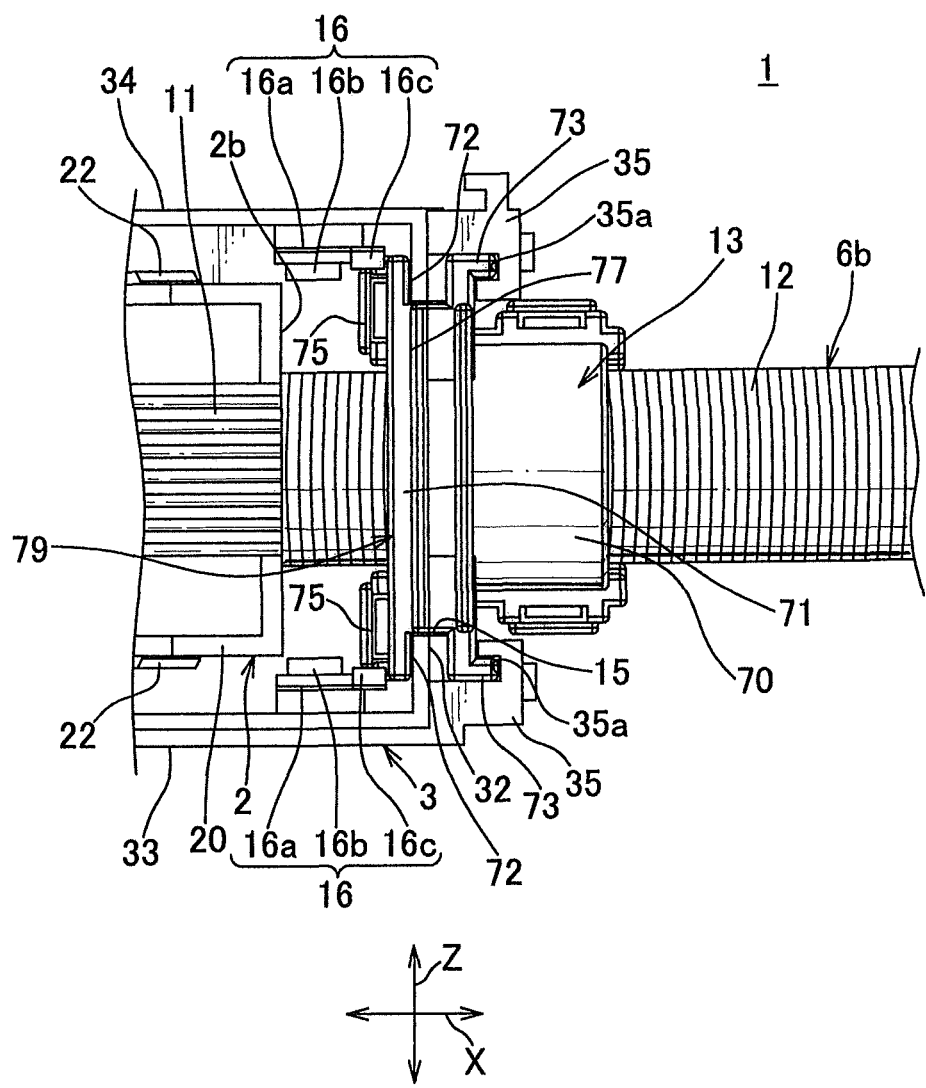
FIG. 16 is a plan view of the case main body and the holder mounted at the second wiring harness when viewed from top.

The three holders 13 are made of synthetic resin and formed into the same shape. As shown in FIGS. 5, 6, 16, the holder 13 is formed by two separated members 13a, 13b to be assembled to each other by clamping the corrugate tube 12. The holder 13 includes a wire mount portion 70 mounting the electric wires 11 by positioning the corrugate tube 12 therein and a main body 79 fixed at edges of the wire lead outlet 14, 15.

An inner diameter of the wire mount portion 70 is formed to be same as an outer diameter of the corrugate tube 12. Parts 70a in FIGS. 5 and 6 are lock portions fixing the two separate members 13a, 13b to each other.

The main body 79 includes a flange 71 extending from one end along an axial direction of the wire mount portion 70 in a direction perpendicular to the axial direction, a pair of rail insert portions 73, a pair of lock portions 75, a pair of lock projections 76 and a insert rib 77.

The flange 71 is formed into a square shape plate as a whole, and provided at a central area with a round hole communicated with an inside of the wire mount portion 70. The flange 71 of the holder mounted at the wire lead outlet 14 is inserted from the opening 3b toward the opening 3a into the wire lead outlet 14 so as to cover the wire lead outlet 14. The flange 71 of the holder 13 mounted at the wire lead outlet 15 is inserted from the opening 3a toward opening 3b, that is the fix position 3c into the wire lead outlet 15 so as to cover the wire lead outlet 15. The two holders 13 are arranged in a row along the direction Y at the wire lead outlet 15. An end surface as a side of the square shape flange 71 is provided with an edge parallel to the direction Z of the wire lead outlet 14, 15 or a groove 74 in which an insert rib 77 provided at the other holder 13 is inserted. Each of two other end surfaces of the flange 71, which position the end surface provided with the groove 74 therebetween, is provided with a groove 72 in which an edge parallel to the direction Y of the wire lead outlet 14, 15 is inserted.

The pair of rail insert portions 73 extends vertically from a surface near the wire mount portion 70 of the flange 71 so as to place the wire mount portion 70 therebetween. The pair of rail insert portions 73 extends like a rib shape in parallel to a lengthwise direction of the groove 72. The pair of rail insert portions 73 is inserted into a groove 35a of a rail 35 provided at the case main body 3 as shown in FIG. 16. The rail 35 is provided at each outer surface of the side wall 31, 32 so as to extend in the direction Y. The rail 35 arranges the pair of rail insert portions 73, which is inserted in the groove 35a, movably in the direction Y so as to guide the flange 71 in the wire lead outlet 14, 15.

The pair of lock portions 75 extends with a plate shape from an end near the groove 74 of the flange 71. A surface near the wire mount portion 70 of each lock portion 75 is provided with a recess 75a. A lock projection (not shown) provided at an inner surface of the side walls 31, 32 or the lock projection 76 provided at the other holder 13 is fitted into the recess 75a.

The pair of lock projections 76 is provided to extend projectingly from a surface opposite to a surface near the wire mount portion 70 of the flange 76. The pair of lock projections 76 is provided near an edge of the flange 71 apart from the groove 74. The pair of lock projections 76 as mentioned above is fitted into the recess 75a of the pair of lock portions 75 provided at the other holder 13. In other words, the pair of lock projections 76 provided at the holder 13 mounted at the second wiring harness 6b is fitted into the recess 75a of the pair of lock portions 75 provided at the holder 13 mounted at the third wiring harness 6c.

The insert rib 77 extends vertically from the other edge parallel to the edge of the flange 71, which the groove 74 is provided at. The insert rib 77 extends in parallel to the lengthwise direction of the groove 74. The insert rib 77 is inserted into the groove 74 provided at the other holder 13. In other words, the insert rib 77 provided at the holder 13 mounted at the second wiring harness 6b is inserted into the groove 74 provided at the holder 13 mounted at the third wiring harness 6c.

Thus, the holder 13 mounted at the first wiring harness 6a, in which the corrugate tube 12 is positioned in the wire mount portion 70, is inserted into the wire lead outlet 14 so as to be oriented that the pair of lock portion 75 and the groove 74 are positioned near opening 3a and the main body 79 is along a direction from the opening 3b to the opening 3a. Thereby, the main body 79 is fixed at the edge of the wire lead outlet 14, and the first wiring harness 6a is fixed at the wire lead outlet 14.

The holder mounted at the second wiring harness 6b in which the corrugate tube 12 is positioned in the wire mount portion 70, is inserted into the wire lead outlet 15 so as to be oriented that the pair of lock portion 75 and the groove 74 are positioned near opening 3b and the main body 79 is along a direction from the opening 3a to the opening 3b. Thereby, the main body 79 is fixed at the edge of the wire lead outlet 15, and the second wiring harness 6b is fixed at the wire lead outlet 15. The edge of the wire lead outlet 15 parallel to the direction Z is inserted into the groove 74, and edge of the wire lead outlet 15 parallel to the direction Y is inserted into the groove 72, and the pair of lock projections provided at the inner surface of the side wall 32 is fitted into the recess 75a of the pair of lock portions 75. Thereby, the main body 79 is fixed at the edge of the wire lead outlet 15.

When the main body 79 is inserted into the wire lead outlet 15, the pair of lock portions 75 provided at the holder 13 mounted at the second wiring harness 6b abuts on a tapered surface 16c of an arm portion 16a provided at a later-described pair of maintain arms 16 so as to bend the arm portion 16a apart from the projections 22.

After the holder 13 mounted at the second wiring harness 6b is mounted at the wire lead outlet 15, the holder 13 mounted at the third wiring harness 6c, in which the corrugate tube 12 is positioned in the wire mount portion 70, is inserted into the wire lead outlet 15 so as to be oriented that the pair of lock portion 75 and the groove 74 are positioned near the opening 3b and the main body 79 is along a direction from the opening 3a to the opening 3b. Thereby, the main body 79 is fixed at the edge of the wire lead outlet 15, and the holder 13 mounted at the second wiring harness 6b, and the third wiring harness 6c is fixed at the wire lead outlet 15. The insert rib 77 provided at the holder 13 mounted at the second wiring harness 6b is inserted into the groove 74, and the edge of the wire lead outlet 15 parallel to the direction Y is inserted into the groove 72, and the pair of lock projections 76 provided at the holder 13 mounted at the second wiring harness 6b is fitted into the recess 75a of the pair of lock portions 75. Thereby, the main body 79 is fixed at the holder 13 mounted at the wire lead outlet 15 and the second wiring harness 6b.

The holder 13 mounted at the third wiring harness 6c corresponds to a second holder in claims.

The mount device 81 is provided at the rotation shaft 21 arranged at the one end 2a of the bracket 2 and the case main body 3, and formed by a pair of rotation-shaft mount members 36 as shown in FIG. 3.

Each of the pair of rotation-shaft mount members 36 is provided at each of side walls 33, 34 opposite to each other of the case main body 3. The pair of rotation-shaft mount members 36 is arranged at an end near the side wall 31 and a top end near the opening 3a of the side wall 33, 34. The rotation-shaft mount member 36 is formed as a round hole through the side wall 33, 34 and a diameter thereof is formed to have the dimension same as the rotation shaft 21. Both ends of the rotation shaft 21 along the axial direction are positioned inside the pair of rotation-shaft mount members 36.

A pair of guide grooves 37 extending from an edge near the opening 3a of the side wall 33, 34 to each of rotation-shaft mount members 36 is provided at an inner surface of the side wall 33, 34. The rotation shaft 21 is pushed into the pair of rotation-shaft mount members 36 by sliding the both end in the pair of guide grooves 37. A distance between bottom surfaces opposite to each other of the pair of guide grooves 37 is formed smaller than a dimension along the axial direction of the rotation shaft 21.

When the rotation shaft 21 is mounted at the pair of rotation-shaft mount members 36, the one end 2a along the lengthwise of the bracket 2 is positioned near the side wall 31 and the other end 2a is positioned near the side wall 32.

At the case main body 3 in the first case 1a provided with the mount device 81, the bracket 2 is mounted movably between the near position near the opening 3a of the case main body 3 and the fix position 3c deeper than the near position.

According to this embodiment, the bracket 2 is positioned at the near position near the opening 3a by the later-described maintain device 82 so as to project a top end of the bracket 2 above the opening 3a, as shown in FIGS. 8-14. According to this embodiment, when the bracket 2 is positioned at the fix position 3c and fixed by the later-described fix device 83 at the case main body 3, all part of the bracket 2 is received in the case main body 3 as shown in FIG. 2.

According to this embodiment, when the bracket 2 is positioned at the fix position 3c, the other end 2b of the bracket 2 is positioned at a position further from the opening 3a than the one end 2a, so that the bracket 2 is inclined about the direction X.

When the bracket 2 is positioned at the fix position 3c, the electric wire 11 of the first wiring harness 6a, the connectors 7a, 8a, 9a, 10a of which are mounted at the bracket main body 20, is positioned deeper than the bracket 2 in the case main body 3 as shown in FIG. 2. The electric wire 11 is led through the wire lead outlet 14 out from the case main body 3. When the bracket 2 is positioned at the fix position 3c, the electric wires 11 of the second wiring harness 6b and the third wiring harness 6c, the connectors 7b, 7b', 8b, 9b, 10b, 10b' of which are fitted with the connectors 7a, 8a, 9a, 10a mounted at the bracket main body 20, are positioned at the near position nearer to the opening 3a than the bracket 2. in the case main body 3. The electric wires 11 are led through the wire lead outlet 15 out from the case main body 3.

Furthermore, the connectors 10b, 10b' of the third wiring harness 6c are mounted at the one end 2a apart from the wire lead outlet 15 of the bracket main body 20, and the connectors 7b, 7b', 8b, 9b are mounted at the other end 2b near the wire lead outlet 15 of the bracket main body 20 as shown in FIG. 2.

The maintain device 82 includes a pair of maintain arms 16 provided respectively at an inner surface of the side walls 33, 34 opposite to each other, and a pair of projection 22 projecting from each of outer surfaces of the bracket 2 opposite to the side walls 33, 34, as shown in FIGS. 9-14.

The pair of maintain arms 16 is arranged at a top end near the side wall 32 and the opening 3a of the side wall 33, 34. Each of the pair of maintain arms 16 includes a plate-shaped arm portion 16a continuous to the inner surface of the side wall 33, 34 and extending from the fix position 3c toward the opening 3a with a gap between the inner surface and it so as to be bendable nearing the side wall 33, 34, that is parting from the projection 22; and an overlap portion 16b projecting from a surface opposite to the projection 22 of the arm portion 16a and overlapping the projection 22 along a lengthwise direction of the arm portion 16a.

The maintain device 82 according to the present invention includes at least the pair of projection 22, the pair of arm portions 16a and the pair of overlap portions 16b.

A tapered surface 16c is provided at a top end of the arm portion 16a. The tapered surface 16c is inclined so as to part from the side wall 33, 34 according to going from the top end of the arm portion 16a toward a base end of the arm portion 16a, that is toward an inside of the case main body 3.

According to the first case 1a including the maintain device 82, the overlap portion 16b and the projection 22 are overlapped so as to position the overlap portion 16b nearer the fix position 3c, that is lower than the projection 22. In other words, the projection 22 is placed over the overlap portion 16b. Thereby, it is maintained that the bracket 2 is positioned at the near position near the opening 3a. When the bracket 2 is positioned at the near position near the opening 3a, and the arm portion 16a is bent so as to near the side wall 33, 34, that is part from the projection 22, the overlap portion 16b parts from the projection 22, so that the bracket 2 can move toward the fix position 3c.

Figure 13:
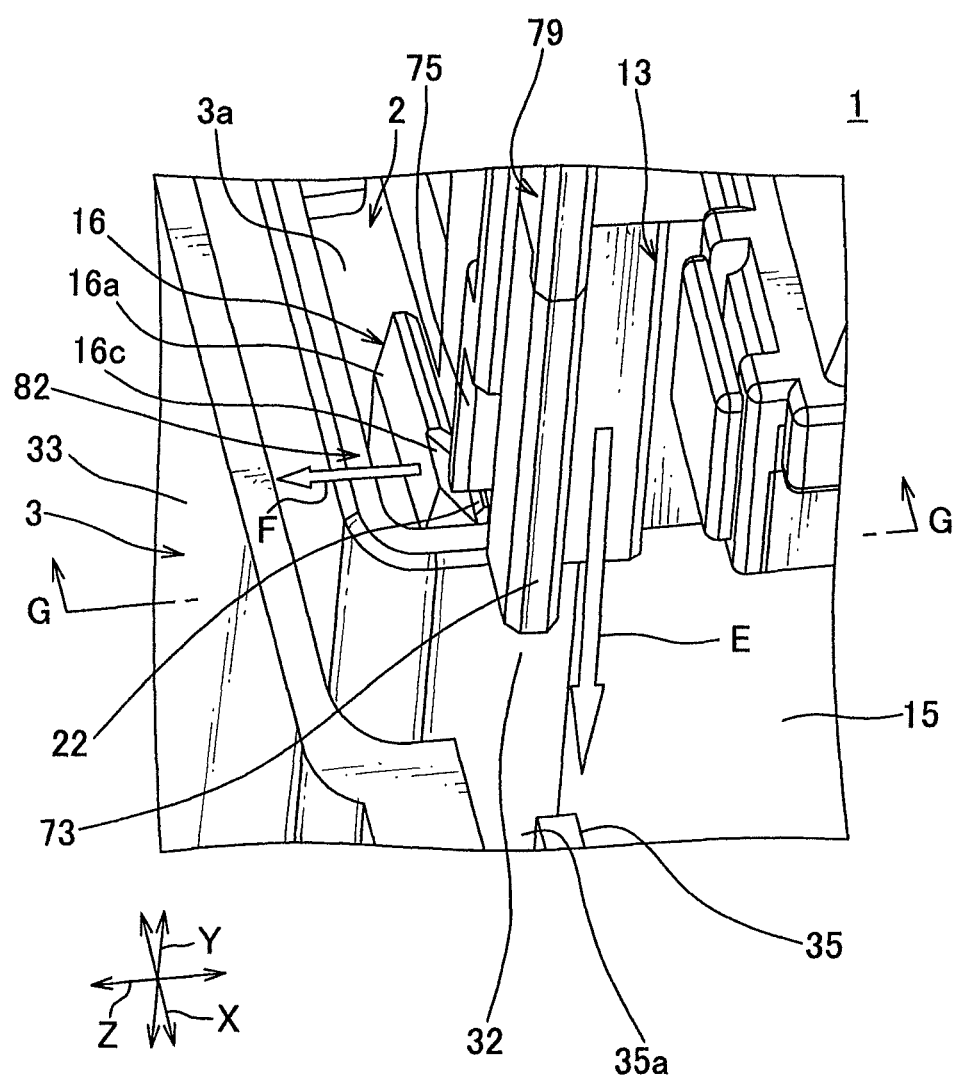
FIG. 13 is a perspective view of a maintaining arm of the case main body shown in FIG. 12 and a main body of the holder.
Figure 14:
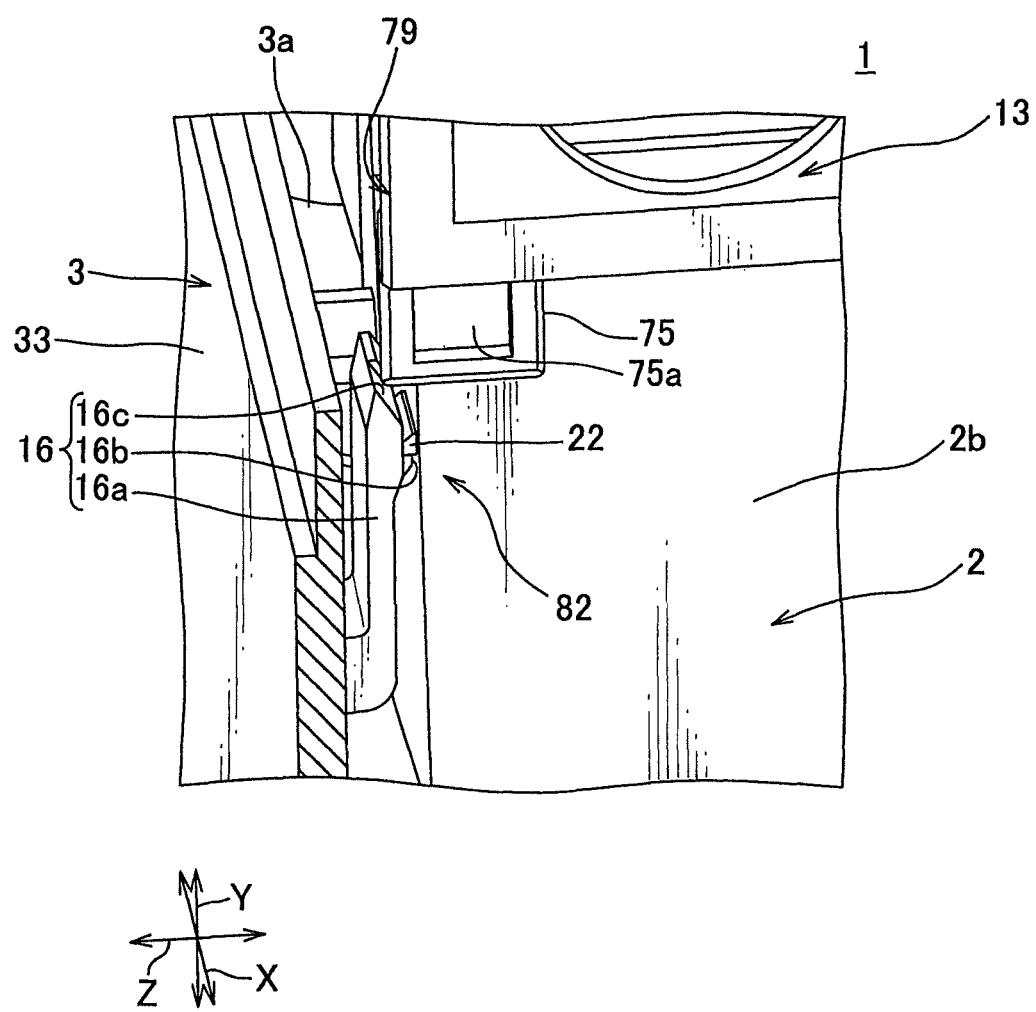
FIG. 14 is a cross-sectional perspective view taken along the line G-G in FIG. 13.
Figure 15:
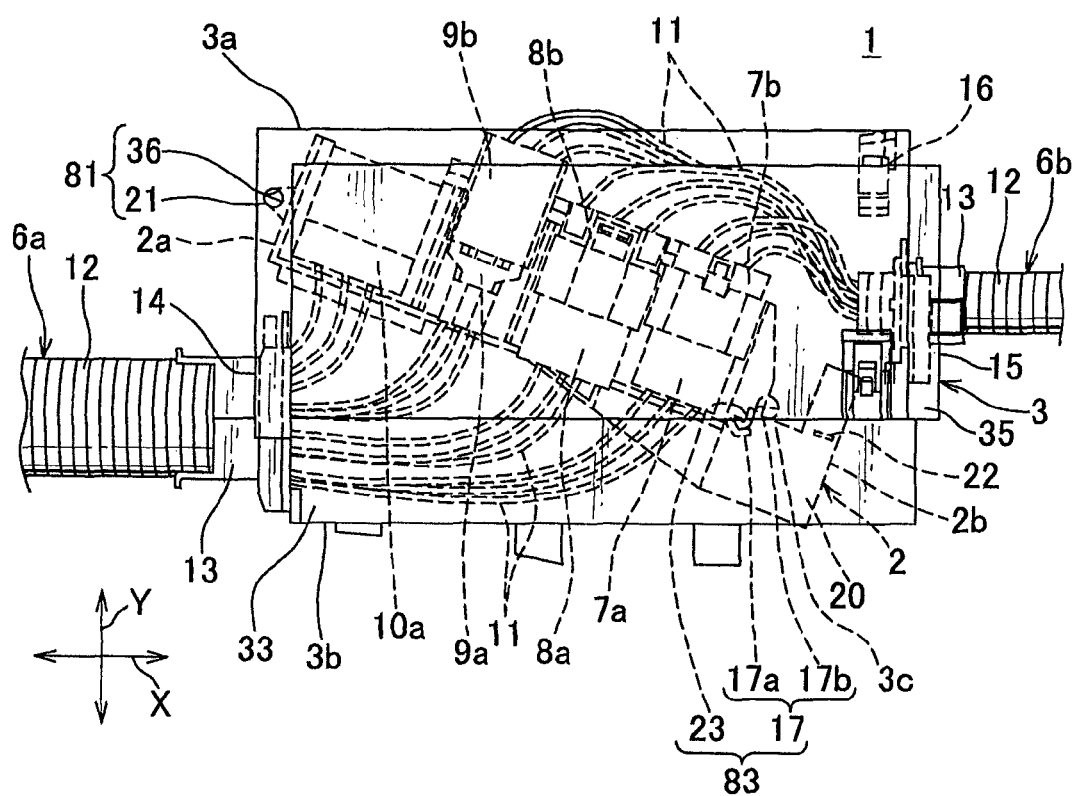
FIG. 15 is an illustration explaining a method for assembling the electric connection box shown in FIG. 2, and showing the holder mounted at the second wiring harness shown in FIG. 11 inserted into the wire lead outlet and the bracket moved to a deep area of the case main body and fixed at a fix position.

According to this embodiment, when the main body 79 of the holder 13 mounted at the second wiring harness 6b is inserted in to the wire lead outlet 15 along a direction arrow E, the pair of lock portions 75 abuts on the tapered surface 16c of the pair of arm portions 16a. Thereby, the pair of arm portions 16a is bent so as to part from each of projections 22 as shown in FIG. 13 (one of arm portions 16a is bent toward a direction arrow F and the not-shown other of arm portions 16a is bent toward a direction opposite to the direction arrow F)₇

Figure 4:
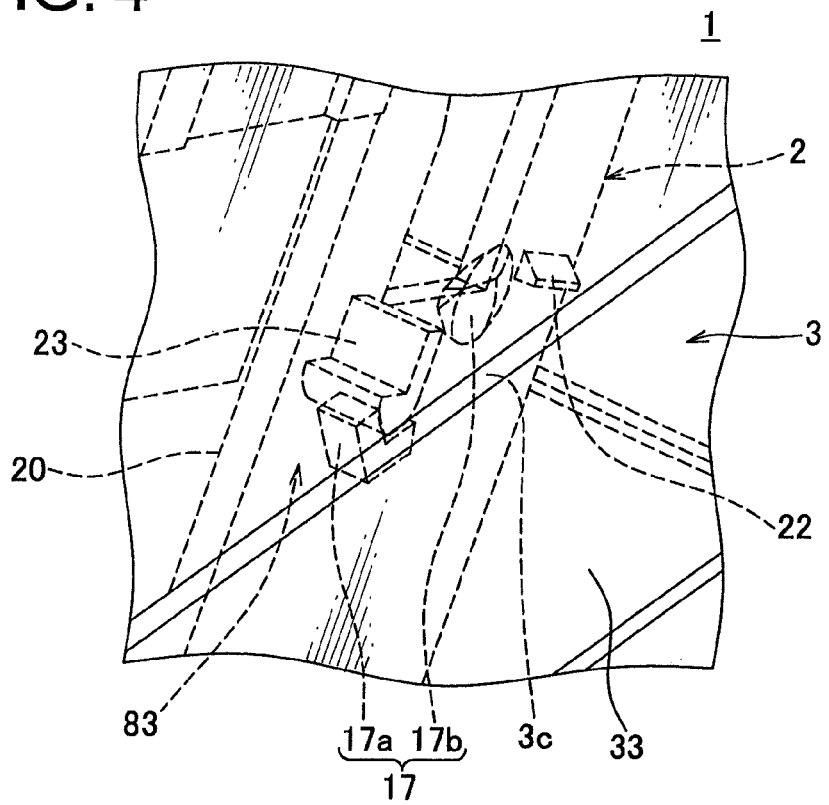
FIG. 4 is a transparent view of an area A shown in FIG. 2.

The lock device 83 is formed by the protrusion 23 provided at the outer surface of the bracket 2 and a protrusion lock member 17 provided at the inner surface of the side wall 33 as shown in FIG. 4.

The protrusion lock member 17 is formed by a first lock portion 17a projecting from the inner surface of the side wall 33, and a second lock portion 17b projecting with a half spherical shape from the inner surface of the side wall 33. The first lock portion 17a is formed into a V-shape in plan view, and the protrusion 23 is positioned inside the V-shape so as to limit motion of the protrusion 23 toward the opening 3b. The second lock portion 17b is arranged with an interval about the first lock portion 17a so as to be nearer to the side wall 32 than the first lock portion 17a. The second lock portion 17b abuts on the protrusion 23 positioned inside the V-shape of the first lock portion 17a so as to limit the motion of the protrusion 23 toward the opening 3a. In other words, the protrusion 17 positions the protrusion 23 between the first lock portion 17a and the second lock portion 17*b* so as to limit motion of the protrusion 23 toward the opening 3*b* or the opening 3*a*.

When the bracket 2 is moved from the near position near the opening 3*a* toward the fix position, the protrusion 23 goes on the second lock portion 17*b* and the bracket 2 is bent temporarily so as to part from the second lock portion 17*b*; and when the protrusion 23 goes over the second lock portion 17*b*, and is positioned between the first lock portion 17*a* and the second lock portion 17*b*, the bracket 2 is restored from a bending state to a original state so as to be positioned at the fix position 3*c*, so that the bracket 2 is fixed at the case main body 3.

Next, a method for assembling the above-mentioned first case 1*a* and the electric connection box 1 is described. The upper cover 4, the lower cover 5, the bracket 2 and the holder 13 are removed from the case main body 3. Each holder 13 is mounted around the corrugate tube 12 of the wiring harness 6*a*, 6*b*, 6*c*.

As shown in FIG. 7, the connector 7*a*, 8*a*, 9*a*, 10*a* of the first wiring harness 6*a* are mounted at the bracket main body 20. The bracket 2 is passed from the opening 3*b* through the case main body 3 and the opening 3*a* out of the case main body 3 as shown by a two-dot chain line with an arrow B in FIG. 7, and the rotation shaft 21 is mounted at the pair of rotation-shaft mount members 36. The holder 13 mounted at the corrugate tube 12 is mounted at the wire lead outlet 14 as shown by a two-dot chain line with an arrow C in FIG. 7.

Figure 8:
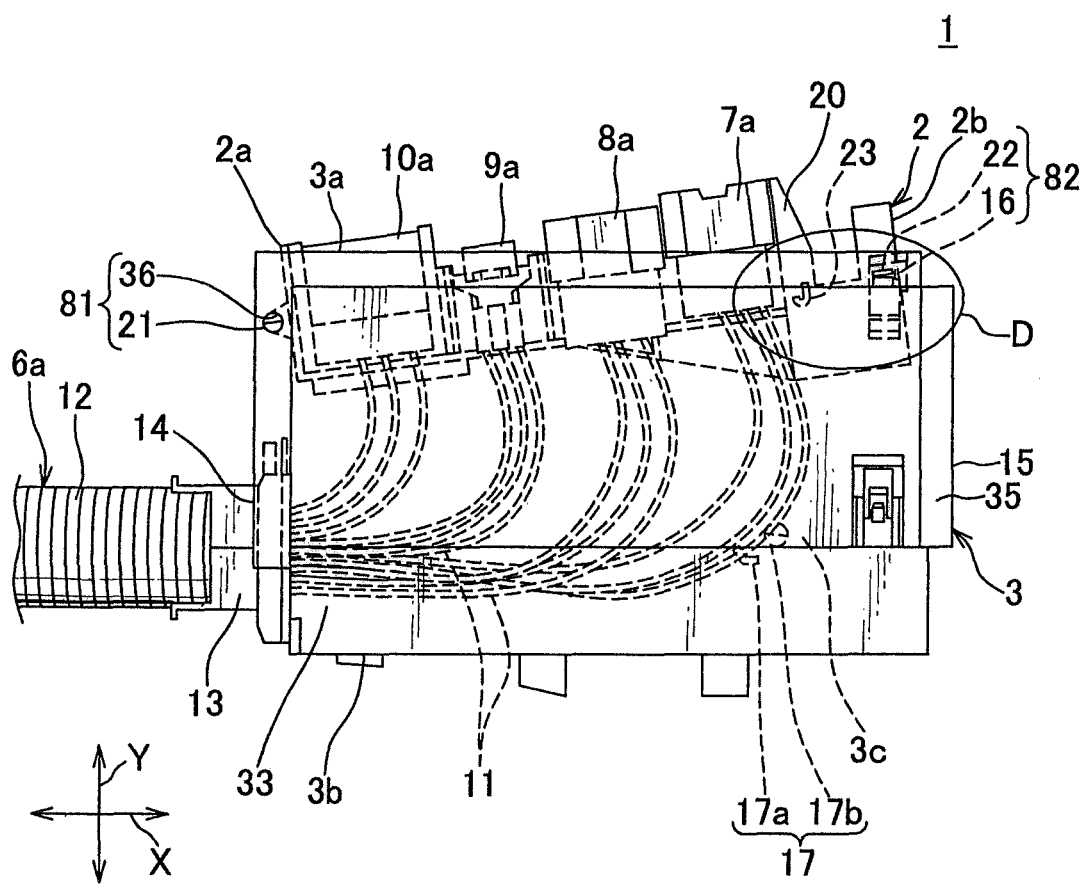
FIG. 8 is an illustration explaining a method for assembling the electric connection box shown in FIG. 2, and showing the bracket shown in FIG. 7 positioned at a near position near an opening of the case main body.
Figure 9:
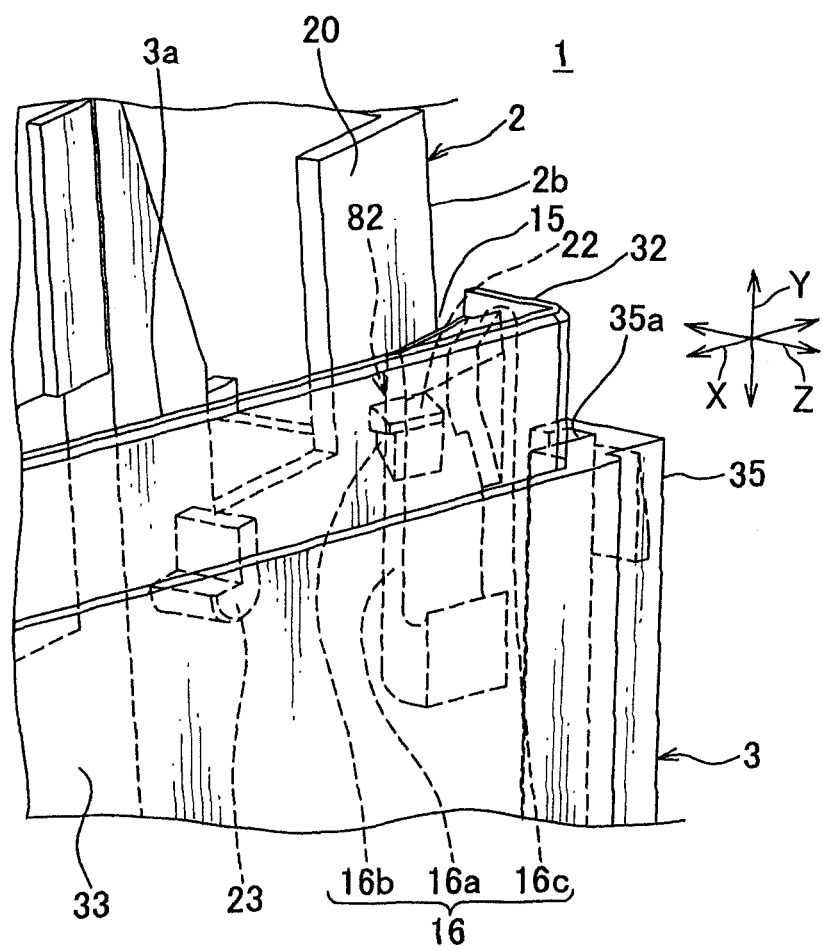
FIG. 9 is a transparent view showing an area D shown in FIG. 8.

Next, as shown in FIGS. 8, 9, the pair of projections 22 provided at the bracket 2 is placed on each overlap portion 16*b* of the pair of maintain arms 16. Thereby, the bracket 2 is maintained to be positioned at the near position near the opening 3*a*.

Next, as shown in FIG. 10, each connector 7*b*, 7*b'*, 8*b*, 9*b* of the second wiring harness 6*b* is fitted into each connector 7*a*, 8*a*, 9*a* of the first wiring harness 6*a* which is already mounted at the bracket 2. In the condition that the top end of the bracket 2 is projected above the opening 3*a*, that is the bracket 2 is positioned at the near position near the opening 3*a*, this operation of fitting is acted. Therefore, the operation of fitting connectors can be easily acted even if the opening 3*a* of the case main body 3 has narrow dimension.

Next, as shown in FIGS. 11-14, the holder 13 mounted at the corrugate tube 12 of the second wiring harness 6*b* is moved close to the wire lead outlet 15. As shown in FIG. 2. 15, 16, the holder 13 is mounted at the wire lead outlet 15. As mentioned above, when the main body 79 of the holder 13 is inserted into the wire lead outlet 15, the pair of lock portions 75 abuts on the taper surface 16*c* of the pair of arm portion 16*a*. Thereby, the pair of arm portions 16*a* is bent so as to part from each projection 22, and the overlap portion 16*b* is parted from the projection 22. Then, the bracket 2 rotates toward the fix position 3*c* by self-weight. By pushing the bracket 2 further toward the fix position 3*c*, the protrusion 23 is positioned between the first lock portion 17*a* and the second lock portion 17*b*. Thus, the bracket 2 is positioned at the fix position 3*c* and fixed at the case main body 3 by the fix device 83.

According to the present invention, by an operation of mounting the holder 13 to the wire lead outlet 15, a state of holding the bracket 2 by the maintain device 82 is released, so that the bracket 2 can be moved from the near position near the opening 3*a* toward the fix position 3*c*. According to the present invention, the mount device 81 mounting the bracket 2 movably at the cease main body 3, so that an operation of moving the bracket 2 rotationally from the near position near the opening 3*a* toward the fix position 3*c* can be acted easily.

Figure 17:
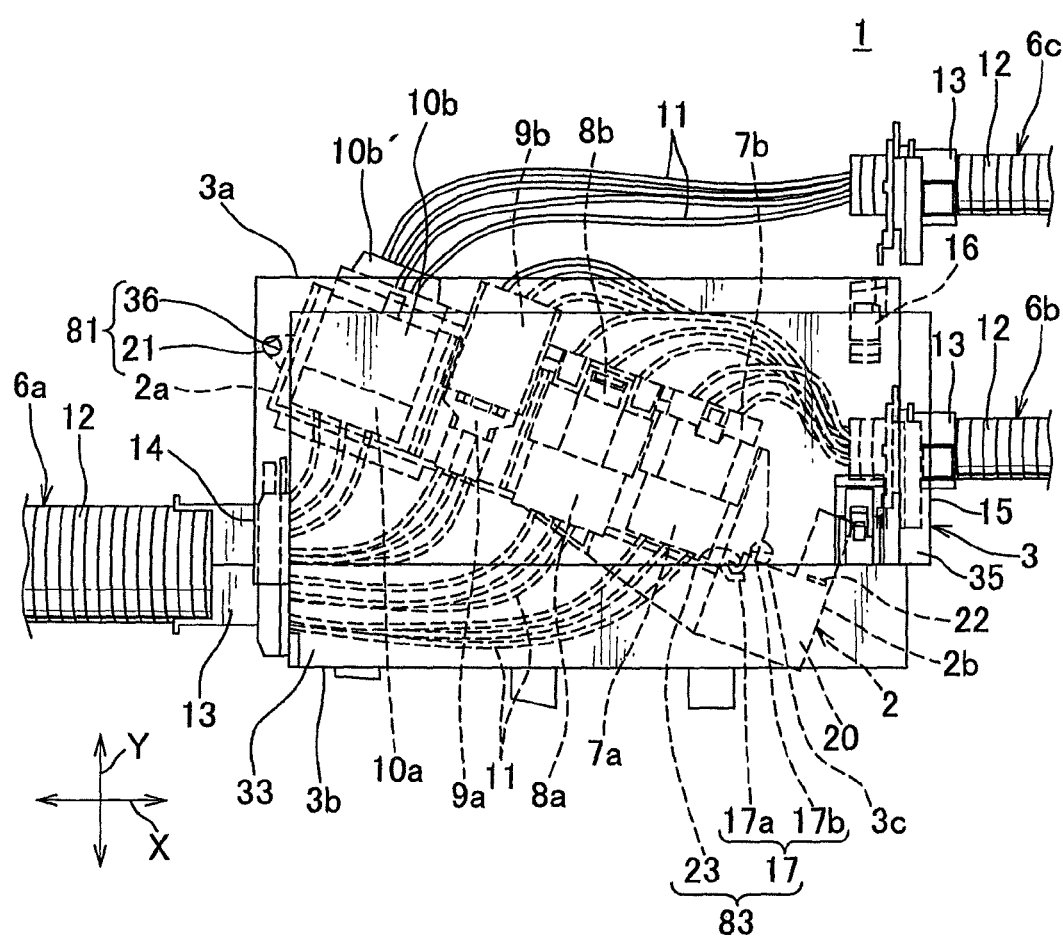
FIG. 17 is an illustration explaining a method for assembling the electric connection box shown in FIG. 2, and showing connectors of a third wiring harness fitted with the connectors of the first wiring harness mounted at the bracket shown in FIG. 15.
Figure 18:
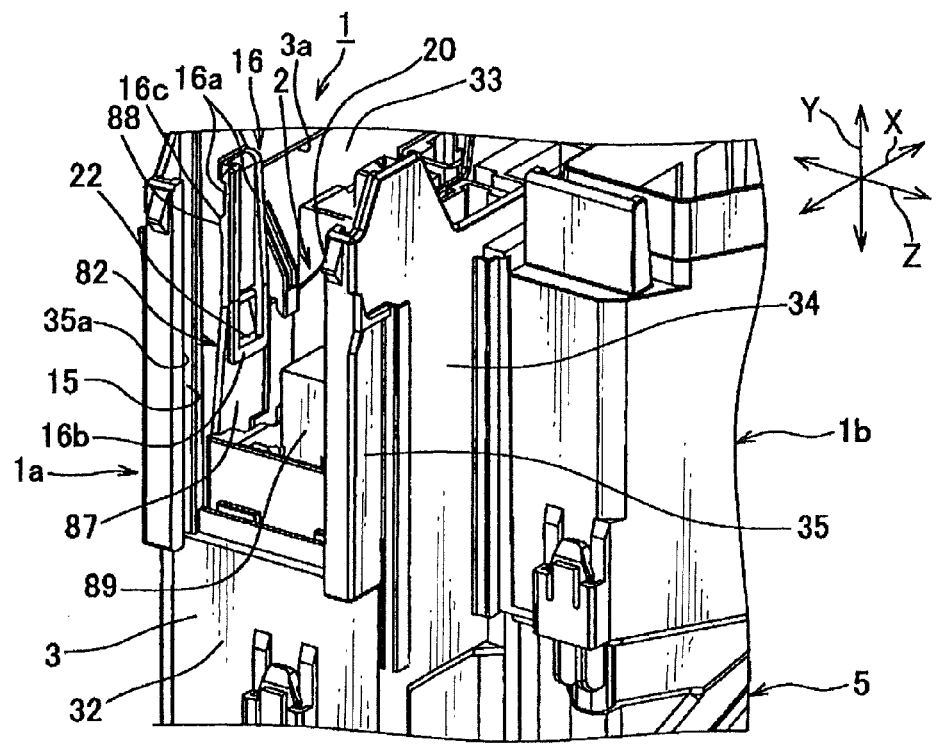
FIG. 18 is a perspective view of one modification of the limit member of the electric connection box shown in FIG. 1.
Figure 19:
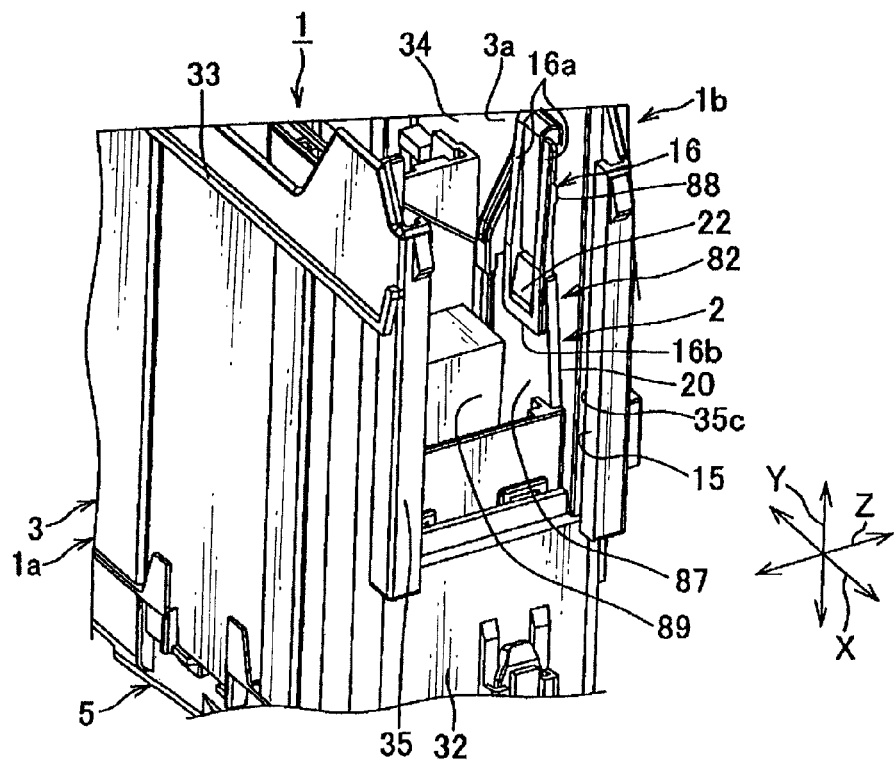
FIG. 19 is another perspective view of the limit member of the electric connection box shown in FIG. 18.

Next, as shown in FIG. 17, each connector 10*b*, 10*b'* of the third wiring harness is fitted into each connector 10*a* of the first wiring harness 6*a*, which is already mounted at the bracket 2.

According to the present invention, for the operation of fitting, when the bracket 2 is positioned at the fix position 3*c*, the one end 2*a* of the bracket 2 is positioned at the near position near the opening 3*a*, and the connector 10*b*, 10*b'* of the third wiring harness 6*c* is fitted to the connector 10*a* mounted at a position near the one end 2*a* of the bracket main boy 20. Thereby, the operation of fitting can be acted at the near position near the opening 3*a*. Therefore, the operation of fitting connectors can be easily acted even if the opening 3*a* of the case main body 3 has narrow dimension.

According to the present invention, the holder 13 mounted at the corrugate tube 12 of the third wiring harness 6*c* is mounted at a position nearer to the opening 3*a* of the wire lead outlet 15 than a position in which the holder 12 mounted at the corrugate tube 12 of the second wiring harness 6*b*. Thereby, it can be prevented that electric wires 11 of the wiring harness 6*b*, 6*c* are gathered too close in the case main body 3.

Next, the holder mounted at the corrugate tube 12 of the third wiring harness 6*c* is mounted at the wire lead outlet 15. Thereafter, the upper cover 4 is attached to the opening 3*a* and the lower cover 5 is attached to the opening 3*b*. Thus, operation of assembling the first case 1*a* is completed.

According to the present invention, the bracket 2 is positioned at the fix position 3*c*, and the electric wire 11 of the second wiring harness 6*b* and the electric wire 11 of the third wiring harness 6*c* are received in the case main body 3. In such state, the upper cover 4 can be attached on the opening 3*a*, so that the operation of attaching the upper cover 4 can be easily acted. On the operation of attaching the upper cover 4, it can be prevented that the electric wire 11 is caught between the case main body 3 and the upper cover 4.

Thereafter, the first case 1*a* and the second case 1*b* are fixed to each other, and fixing members 18*a*, 18*b*, 18*c* are attached to the first case 1*a* and the second case 1*b*. Thus, operation of assembling the electric connection box 1 is completed. Operation of fixing the first case 1*a* and the second case 1*b* can be acted before assembling the case 1*a*.

In the first case 1*a* assembled as mentioned above, the bracket 2 is positioned at the fix position deeper than the near position near the opening 3*a* of the case main body 3. Thereby, the electric wire 11 is not pressed strongly by the upper cover 4 and the lower cover 5. Also, it can prevent from gathering electric wires 11 too close in the case main body 3. The bracket 2 is positioned at the fix position 3*c* so as to be inclined about the direction X, so that the electric wires 11 led from the bracket 2 toward the wire lead outlets 14, 15 are spread in the direction Y. Thereby, it can be prevented that electric wires 11 are gathered too close in the case main body 3. The bracket 2 is positioned at the fix position 3*c* so as to be inclined about the direction X, so that the electric wires 11 led from the bracket 2 toward the wire lead outlets 14, 15 can be led without over-bent. Thus, the electric wires 11 can be led in a suitable path in the first case 1*a* of the electric connection box 1.

According to the present invention, the first case 1*a* and the electric connection box 1, in which the operation of fitting connectors 7*a*, 7*b*, 7*b'*, 8*a*, 8*b*, 9*a*, 9*b*, 10*a*, 10*b*, 10*b'* can be easily acted even if the opening 3*a* of the case main body 3 has narrow dimension, and it can be prevented that electric wires 11 connected with the connectors 7*a*, 7*b*, 7*b'*, 8*a*, 8*b*, 9*a*, 9*b*, 10*a*, 10*b*, 10*b'* are gathered too close in the case main body 3, the electric wires 11 can be led in a suitable path, and assembling can be acted by having a simple structure, can be provided.

In the above embodiment, an example, in which the maintain arm 16 is arranged at the case main body 3, and the projection 22 is arranged at the bracket 2, is described. According to the present invention, the maintain arm 16 can be arranged at the bracket 2, and the projection 22 can be arranged at the case main body 3.

In the above embodiment, an example, in which the bracket 2 is mounted rotatably at the case main body 3 by the mount device 81, is described. According to the present invention, the bracket may be mounted at the case main body movably along a depth direction of the case main body by the mount device.

In the above embodiment, an example, in which the electric connection box 1 includes the first case 1a and the second case 1b, is described. According to the present invention, the electric connection box may have at least the first case 1a.

According to the present invention, the maintain device 82 and the holder 13 can be formed as shown in FIGS. 18-21. Components in FIGS. 18-21 same as the above-mentioned embodiment are given the same marking and the description is omitted.

Figure 20:
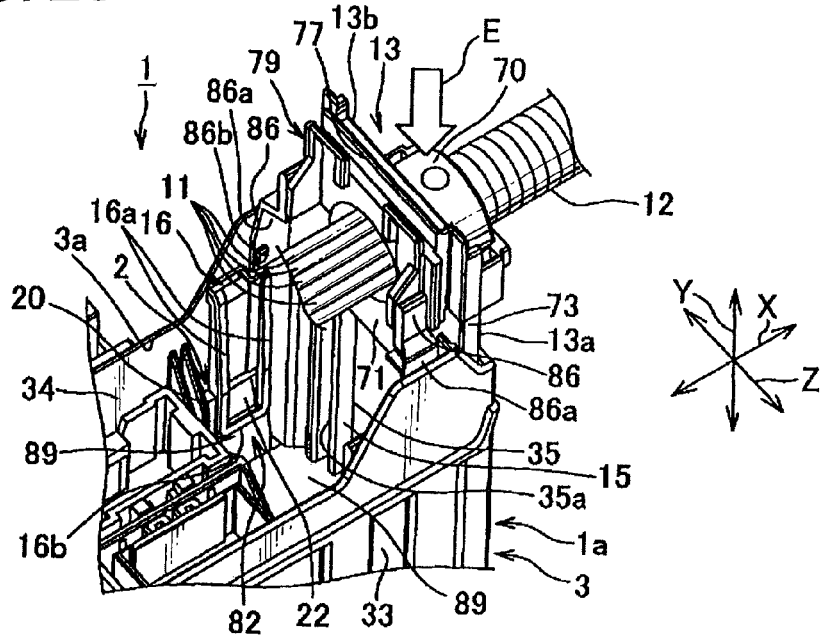
FIG. 20 is a perspective view of the holder of the first case of the electric connection box shown in FIG. 18.
Figure 21:
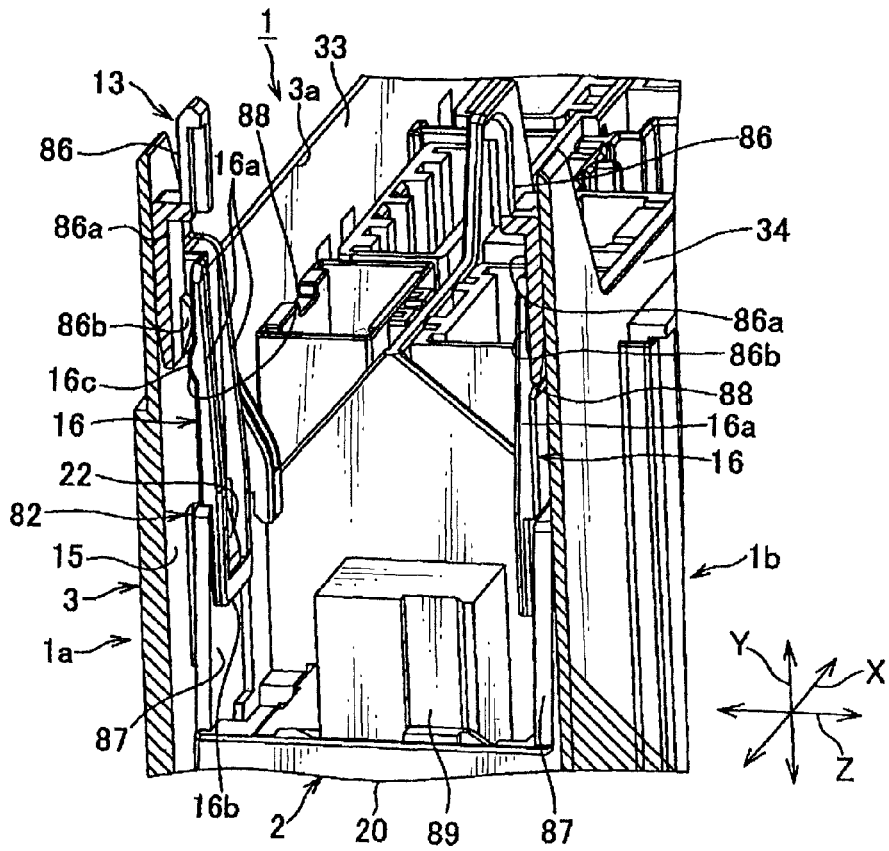
FIG. 21 is a perspective view for explanation of releasing the limit member of the electric connection box shown in FIG. 18.
Figure 22:
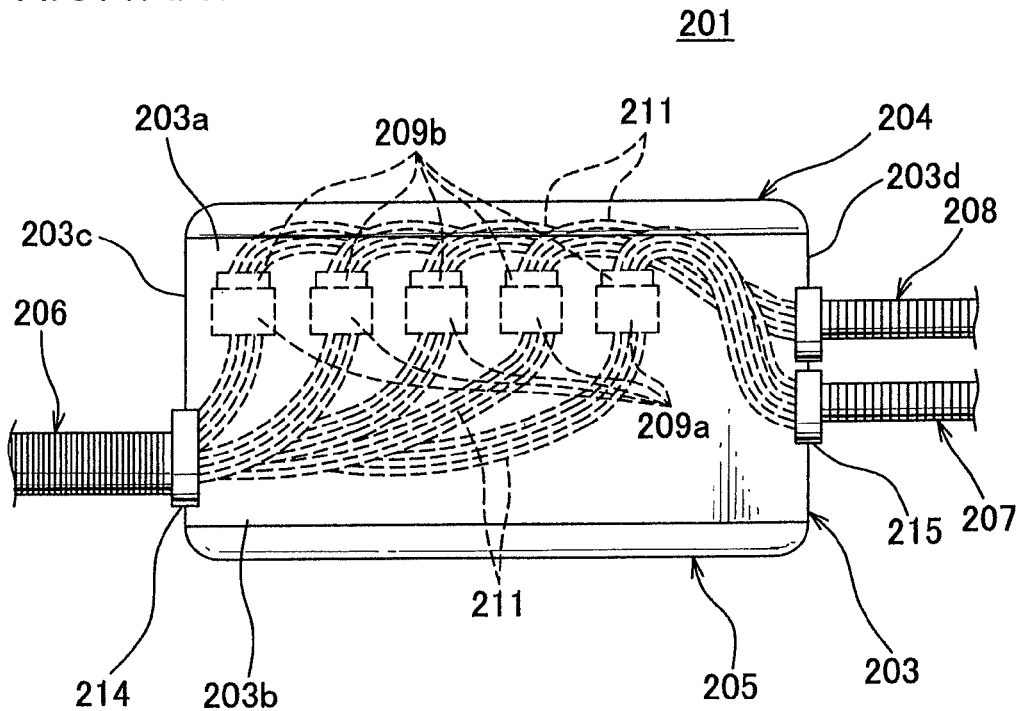
FIG. 22 is a transparent view of an electric connection box by prior art.
Figure 23:
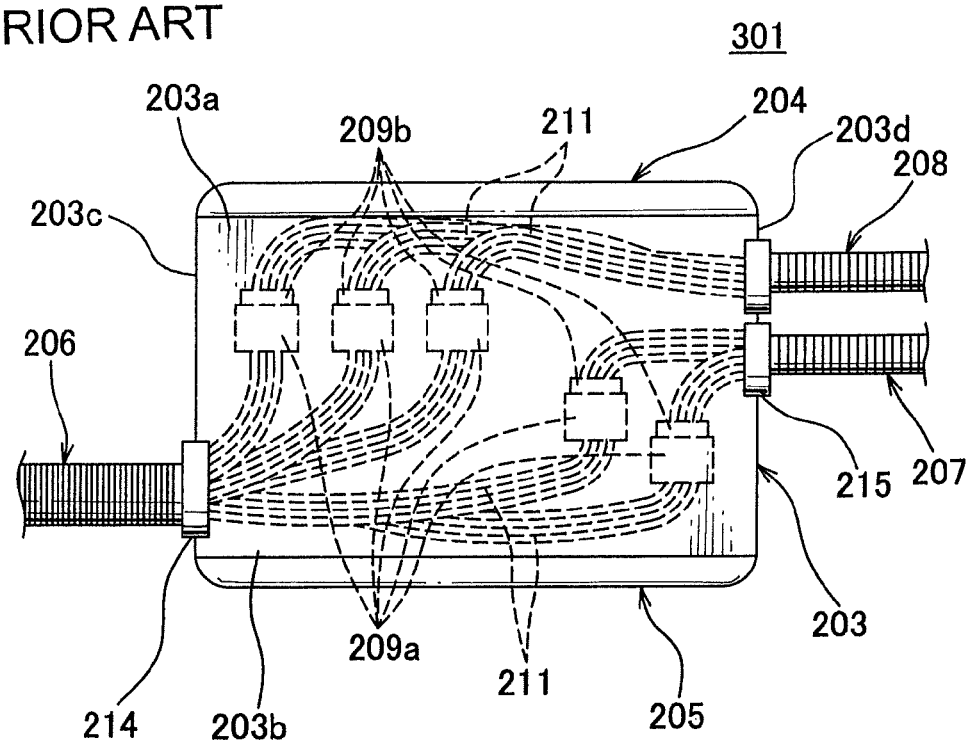
FIG. 23 is a transparent view of another electric connection box by prior art.

In the embodiment shown in FIGS. 18-21, the holder 13 is provided with a pair of release arms 86 as shown in FIGS. 20, 21. The release arms 86 include a pair of arm portions 86a continuous to the flange 71 of the main body 79, and a release projection 86b provided at a top end of the arm portion 86a. The arm portion 86a is continuous to both ends along the direction Z of the flange 71 of the main body 79, and extends linearly from the both ends toward the lower cover 5. The release projection 86b is formed projectingly from the top end of the arm portion 86a of the release arm 86 so as to approach each other.

When the above-mentioned holder 13 is mounted at the second wiring harness 6b and the main body 79 is inserted into the wire lead outlet 15, the release projection 86b of the release arm 86 abuts on a later-described tapered surface 16c of a release projection 88 arranged at the pair of maintain arms 16 so as to bend the overlap portion 16b of the arm portion 16a to be part from the projection 22.

The maintain device 82 shown in FIGS. 18-21 includes the pair of maintain arms 16 provided respectively at each inner surface of side walls 33, 34 opposite to each other, and the pair of projections 22 projecting from the inner surfaces of the outer walls 87 of the bracket 2 overlapping the side walls 33, 34.

The pair of maintain arms 16 is arranged at the end near the side wall 32 and the top end near the opening 3a of the side wall 33, 34. One end of the pair of maintain arms 16 is continuous to the top end of the inner surface of the side wall 33, 34, and extends from a side of the opening 3a toward the fix position 3c, and the other end part from the opening 3a of the pair of maintain arms 16 is formed as a free end. The pair of maintain arms 16 includes a pair of arm portion 16a with a bar shape bendable so as to part the other end from the side wall 33, 34, that is from the projection 22; and an overlap portion 16b with a bar shape able to overlap to the projection 22 along the lengthwise of the arm portion 16a.

In a middle area of the arm portion 16a, the release projection 88 projecting toward the inner surface of the side wall 33, 34 is arranged. The release projection 88 includes the tapered surface 16c. The tapered surface 16c is inclined so as to near the inner surface of the side wall 33, 34 forwarding from the one end to the other end, that is inclined toward the outside of the case main body 3.

According to the first case 1a having the maintain device 82, the overlap portion 16b is overlapped on the projection 22 so as to be positioned nearer the fix position 3c, that is lower than the projection 22. In other words, the projection 22 is placed on the overlap portion 16b, so that the bracket 2 is maintained to be positioned at the near position near the opening 3a. In a state that the bracket 2 is positioned near the opening 3a, the arm portion 16a is bent so as to part from the side wall 33, 34, that is part from the projection 22, so that the overlap portion 16b is released from the projection 22 and the bracket 2 can move toward the fix position 3c.

As shown in FIG. 20, when the main body 79 of the holder 13 mounted at the second wiring harness 6b is inserted along the arrow E direction into the wire lead outlet 15, the release projection 86b provided at the top end of the release arm 86 abuts on the taper surface 16c of the release projection 88 of the pair of arm portions 16a. Thereby, the pair of arm portions 16a is bent so as to part from each projection 22 (shown by an arrow in FIG. 21).

According to the examples shown in FIGS. 18-21, the electric connection box, which can be assembled easily with a simple structure, can be provided. The release projection 86b is arranged at the middle area of the arm portion 86a and the overlap portion 16b is arranged at the other end of the arm portion 86a. Thereby, when the release projection 86b of the release arm 86 of the holder 13 releases overlap of the overlap portion 16b and the projection 22, the holder 13 parts from the bracket 2 as shown in FIGS. 20 and 21. Therefore, many electric components, such as relay 89, can be mounted near the limit device 82 of the bracket 2. Therefore, packaging density of the bracket 2 is improved so as to mount more electric components and the bracket 2, that is electric connection box can be miniaturized.

In the example shown in FIGS. 18-21, the maintain arm 16 can be arranged at the bracket 2 and the projection 22 can be arranged at the case main body 3.

The present inventions are described based in the embodiments as mentioned above, but the present invention is not limited in above embodiments. Various change and modifications can be made with the scope of the present invention.

INDUSTRIAL APPLICABILITY

The electric connection box according to the present invention can be used as an electric connection box mounted in an engine room of a car. In the electric connection box according to the present invention, operation of fitting connectors can be easily acted even if the opening of the case main body has narrow dimension, and it can be prevented that the electric wires are gathered too close in the case main body, and assembling can be acted easily.

MARKS

1 Electric connection box
2 Bracket
3 Case main body
3a Opening
3c Fix position
7a, 7b, 7b', 8a, 8b, 9a, 9b, 10a, 10b, 10b' Connector
11 Electric wire
13 Holder
14, 15 Wire lead outlet
16a Arm portion
16b Overlap portion
21 Rotation shaft
22 Projection 31-34 Side wall
36 Rotation-shaft mount member
70 Wire mount portion
79 main body
81 Mount device
82 Maintain device
83 Fix device

The invention claimed is:

1. An electric connection box, comprising:
a bracket in which a plurality of connectors joined with each end of electric wires is mounted;
a case main body receiving the bracket;
a mount device mounting the bracket in the case main body movably between a near position near an opening of the case main body and a fix position deeper than the opening;
a maintain device maintaining a state that the bracket is positioned at the near position near the opening; and
a fix device fixing the bracket, which is positioned at the fix position, at the case main body,
wherein the mount device is formed by a rotation shaft arranged at one end of the bracket and a rotation-shaft mount member arranged at the case main body and mounting the rotation shaft rotatably, and when the bracket is positioned at the fix position, the other end of the bracket is positioned at a far position further than the one end from the opening so as to incline the bracket.

2. The electric connection box according to claim 1, wherein one side wall near the one end of the bracket of a plurality of side walls surrounding the opening of the case main body and the other side wall opposed to the one side wall are provided respectively with a wire lead outlet which the electric wire is led out of the case main body, and the electric wire, which is located at a deep area deeper than the bracket in the case main body when the bracket is positioned at the fix position, is led out of the case main body through the wire lead outlet provided at the one side wall, and the electric wire, which is located at the near position nearer to the opening than the bracket when the bracket is positioned at the fix position, is led out of the case main body through the wire lead outlet provided at the other side wall.

3. The electric connection box according to claim 2, wherein the maintain device comprises:
a projection projecting from one of an inner surface of the side walls surrounding the opening of the case main body and an outer surface of the bracket opposed to the inner surface;
an arm continuous to the other one of the inner surface and the outer surface, and extending from the fix position toward the opening at an interval against the other one so as to be bendable as parting from the projection; and
an overlap member projecting from a surface of the arm opposed to the projection so as to be enable to overlap the projection along a lengthwise direction of the arm,
wherein when the projection and the overlap member are overlapped so as to locate one of the projection and the overlap member, which is provided at the side wall, nearer to the fix position than the other one of the projection and the overlap member, a state that the bracket is positioned at the near position near the opening is maintained, and when the bracket is positioned at the near position near the opening, and the arm is bent so as to part from the projection, the overlap member parts from the projection and the bracket becomes movable toward the fix position.

4. The electric connection box according to claim 3, wherein the wire lead outlet, which is formed to be recessed from an end at the opening side of the side wall surrounding the opening of the case main body toward the fix position and leads the electric wire out of the case main body, is provided with a holder holding the electric wire, wherein the holder comprises a wire mount portion mounting the electric wire and a main body inserted from the opening side of the wire lead outlet toward the fix position into the wire lead outlet so as to abut on the arm and bend the arm to part from the projection and fixed at an edge of the wire lead outlet.

5. The electric connection box according to claim 4, further comprising a second holder holding the electric wire nearer to the opening than the holder at the wire lead outlet, wherein the connector joined with the electric wire held by the second holder is mounted at one end of the bracket far from the wire lead outlet, and the connector joined with the electric wire held by the holder is mounted at the other end of the bracket near the wire lead outlet.

6. The electric connection box according to claim 2, wherein the maintain device comprises:
a projection projecting from one of an inner surface of the side walls surrounding the opening of the case main body and an inner surface of an outer wall of the bracket overlapped to the inner surface;
an arm continuous to the other one of the inner surface of the side walls and the inner surface of the outer wall, and extending from the opening toward the fix position so as to be bendable as parting from the projection; and
an overlap member arranged at an end of the arm apart from the other one so as to be enable to overlap the projection along a lengthwise direction of the arm,
wherein when the projection and the overlap member are overlapped so as to locate one of the projection and the overlap member, which is provided at the side wall, nearer to the fix position than the other one of the projection and the overlap member, a state that the bracket is positioned at the near position near the opening is maintained, and when the bracket is positioned at the near position near the opening, and the arm is bent so as to part from the projection, the overlap member parts from the projection, and the bracket becomes movable toward the fix position.

7. The electric connection box according to claim 6, wherein the wire lead outlet, which is formed to be recessed from an end at the opening side of the side wall surrounding the opening of the case main body toward the fix position and leads the electric wire out of the case main body, is provided with a holder holding the electric wire, wherein the holder comprises a wire mount portion mounting the electric wire and a main body inserted from the opening side of the wire lead outlet toward the fix position into the wire lead outlet so as to abut on the arm and bend the arm to part from the projection and fixed at an edge of the wire lead outlet.

8. The electric connection box according to claim 1, wherein the maintain device comprises:
a projection projecting from one of an inner surface of the side walls surrounding the opening of the case main body and an outer surface of the bracket opposed to the inner surface;
an arm continuous to the other one of the inner surface and the outer surface, and extending from the fix position toward the opening at an interval against the other one so as to be bendable as parting from the projection; and
an overlap member projecting from a surface of the arm opposed to the projection so as to be enable to overlap the projection along a lengthwise direction of the arm,
wherein when the projection and the overlap member are overlapped so as to locate one of the projection and the overlap member, which is provided at the side wall, nearer to the fix position than the other one of the projection and the overlap member, a state that the bracket is positioned at the near position near the opening is maintained, and when the bracket is positioned at the near position near the opening, and the arm is bent so as to part from the projection, the overlap member parts from the projection and the bracket becomes movable toward the fix position.

9. The electric connection box according to claim 8, wherein the wire lead outlet, which is formed to be recessed from an end at the opening side of the side wall surrounding the opening of the case main body toward the fix position and leads the electric wire out of the case main body, is provided with a holder holding the electric wire, wherein the holder comprises a wire mount portion mounting the electric wire and a main body inserted from the opening side of the wire lead outlet toward the fix position into the wire lead outlet so as to abut on the arm and bend the arm to part from the projection and fixed at an edge of the wire lead outlet.

10. The electric connection box according to claim 9, further comprising a second holder holding the electric wire nearer to the opening than the holder at the wire lead outlet, wherein the connector joined with the electric wire held by the second holder is mounted at one end of the bracket far from the wire lead outlet, and the connector joined with the electric wire held by the holder is mounted at the other end of the bracket near the wire lead outlet.

11. The electric connection box according to claim 1, wherein the maintain device comprises:
   a projection projecting from one of an inner surface of the side walls surrounding the opening of the case main body and an inner surface of an outer wall of the bracket overlapped to the inner surface;
   an arm continuous to the other one of the inner surface of the side walls and the inner surface of the outer wall, and extending from the opening toward the fix position so as to be bendable as parting from the projection; and
   an overlap member arranged at an end of the arm apart from the other one so as to be enable to overlap the projection along a lengthwise direction of the arm,
   wherein when the projection and the overlap member are overlapped so as to locate one of the projection and the overlap member, which is provided at the side wall, nearer to the fix position than the other one of the projection and the overlap member, a state that the bracket is positioned at the near position near the opening is maintained, and when the bracket is positioned at the near position near the opening, and the arm is bent so as to part from the projection, the overlap member parts from the projection, and the bracket becomes movable toward the fix position.

12. The electric connection box according to claim 11, wherein the wire lead outlet, which is formed to be recessed from an end at the opening side of the side wall surrounding the opening of the case main body toward the fix position and leads the electric wire out of the case main body, is provided with a holder holding the electric wire, wherein the holder comprises a wire mount portion mounting the electric wire and a main body inserted from the opening side of the wire lead outlet toward the fix position into the wire lead outlet so as to abut on the arm and bend the arm to part from the projection and fixed at an edge of the wire lead outlet.

13. The electric connection box according to claim 12, further comprising a second holder holding the electric wire nearer to the opening than the holder at the wire lead outlet, wherein the connector joined with the electric wire held by the second holder is mounted at one end of the bracket far from the wire lead outlet, and the connector joined with the electric wire held by the holder is mounted at the other end of the bracket near the wire lead outlet.

\* \* \* \* \*